(12) United States Patent
Myers et al.

(10) Patent No.: US 9,777,856 B2
(45) Date of Patent: Oct. 3, 2017

(54) PRESSURE VACUUM RELIEF VALVE

(71) Applicant: Emerson Process Management LLLP, Round Rock, TX (US)

(72) Inventors: James Andrew Myers, Tulsa, OK (US); John David Cockerham, Tulsa, OK (US); Ray William Cecil, III, Mt. Washington, KY (US)

(73) Assignee: Regulator Technologies Tulsa, LLC, Tulsa, OK (US)

( * ) Notice: Subject to any disclaimer, the term of this patent is extended or adjusted under 35 U.S.C. 154(b) by 276 days.

(21) Appl. No.: 14/561,482

(22) Filed: Dec. 5, 2014

(65) Prior Publication Data

US 2015/0167857 A1   Jun. 18, 2015

Related U.S. Application Data

(60) Provisional application No. 61/915,329, filed on Dec. 12, 2013.

(51) Int. Cl.
  *F16K 17/12*    (2006.01)
  *F16K 17/194*    (2006.01)
  (Continued)

(52) U.S. Cl.
  CPC ............ *F16K 17/194* (2013.01); *B65D 90/00* (2013.01); *B65D 90/34* (2013.01); *F16K 17/12* (2013.01);
  (Continued)

(58) Field of Classification Search
  CPC .... Y10T 137/7771–137/7777; Y10T 137/778; Y10T 137/4857; B65D 90/00; B65D 90/34; F16K 17/12; F16K 17/194
  (Continued)

(56) References Cited

U.S. PATENT DOCUMENTS

| 2,112,641 A | 3/1938 | Wheaton |
| 2,603,379 A * | 7/1952 | Friend ............. F01P 11/0238 137/493.4 |

(Continued)

FOREIGN PATENT DOCUMENTS

| FR | 2 129 413 A5 | 10/1972 |
| WO | WO-2008136725 A1 | 11/2008 |

OTHER PUBLICATIONS

International Search Report and Written Opinion for PCT/US2014/069778, mailed Mar. 23, 2015.
(Continued)

*Primary Examiner* — William McCalister
(74) *Attorney, Agent, or Firm* — Marshall, Gerstein & Borun LLP

(57) ABSTRACT

Embodiments of the present disclosure are directed toward a pressure vacuum relief valve and a seal assembly of the pressure vacuum relief valve. The seal assembly includes a ribbed substrate disposed against a flanged seat of the pressure vacuum relief valve. The ribbed substrate includes ribs extending from a base of the ribbed substrate. The seal assembly also includes a pallet coupled to and disposed below the ribbed substrate. The pallet includes a top ring, a bottom ring, and a flexible diaphragm captured between the top ring and the bottom ring. The flexible diaphragm of the pallet is configured to seal against the ribbed substrate in a sealed position. The pallet and ribbed substrate are configured to move together away from the flanged seat when a pressure on a sealed side of the pressure vacuum relief valve exceeds a maximum pressure threshold. The pallet is also configured to pivot open at an angle relative to the sealed position of the pallet when the pressure on the sealed side of the pressure vacuum relief valve falls below a minimum pressure threshold.

18 Claims, 11 Drawing Sheets

(51) Int. Cl.
*B65D 90/34* (2006.01)
*B65D 90/00* (2006.01)

(52) U.S. Cl.
CPC .... *Y10T 137/4857* (2015.04); *Y10T 137/7771* (2015.04)

(58) Field of Classification Search
USPC .................................. 137/493–493.6, 493.9
See application file for complete search history.

(56) References Cited

U.S. PATENT DOCUMENTS

| | | | |
|---|---|---|---|
| 3,699,999 A * | 10/1972 | Dunkelis ................ | F16K 17/19 137/493.4 |
| 4,323,096 A | 4/1982 | Dugge et al. | |
| 4,673,051 A * | 6/1987 | Darling ................ | B62D 5/062 137/493.3 |
| 5,099,870 A * | 3/1992 | Moore ................ | B67D 7/3218 137/493.3 |
| 2003/0168104 A1 | 9/2003 | Liebert | |
| 2004/0199351 A1 | 10/2004 | Ott et al. | |
| 2007/0131283 A1 | 6/2007 | Rogers et al. | |
| 2008/0288321 A1 | 11/2008 | Dillon et al. | |
| 2009/0077662 A1 | 3/2009 | Law et al. | |
| 2011/0270418 A1 | 11/2011 | Law et al. | |
| 2012/0079407 A1 | 3/2012 | Holmes et al. | |

OTHER PUBLICATIONS

International Preliminary Report on Patentability for PCT/US2014/069778, mailed Jun. 23, 2016.
International Search Report and Written Opinion for PCT Application No. PCT/US2013/040354 dated Mar. 13, 2015; pp. 17.

\* cited by examiner

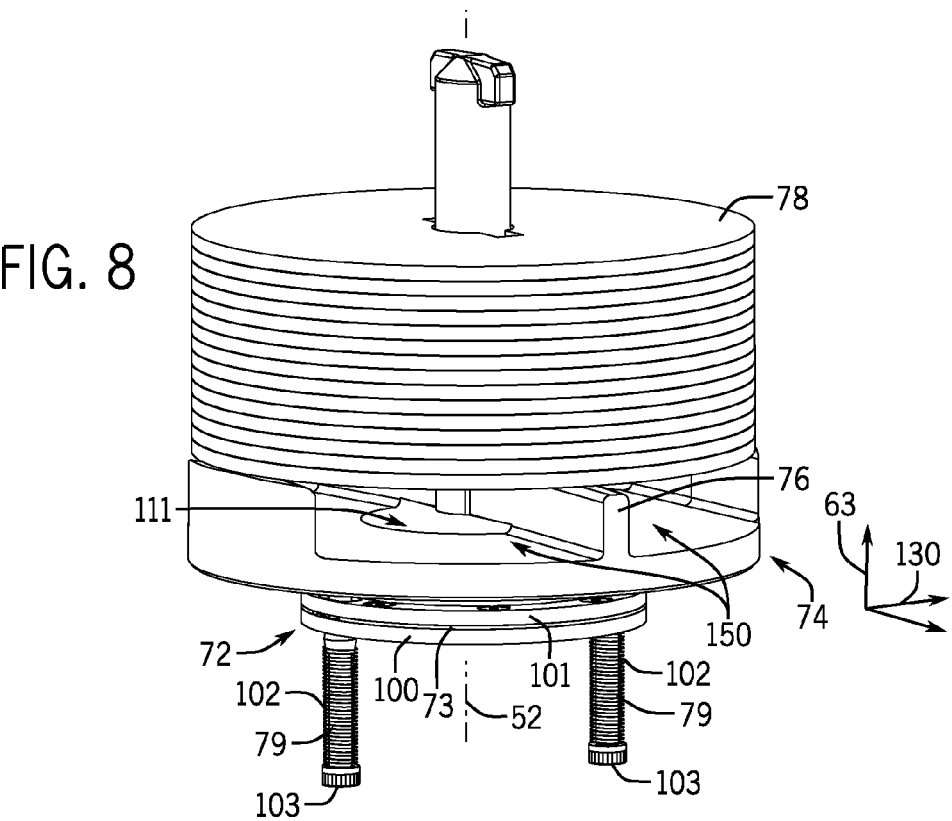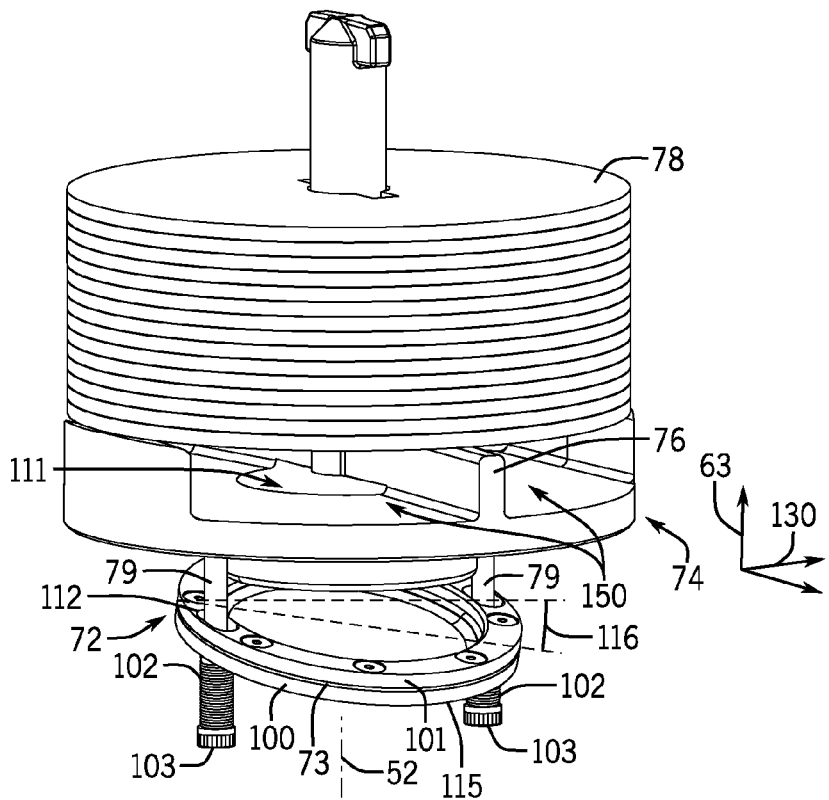

PRESSURE VACUUM RELIEF VALVE

CROSS-REFERENCE TO RELATED APPLICATION

This application is a non-provisional application and claims priority to U.S. Provisional Patent Application No. 61/915,329, entitled "Pressure Vacuum Relief Valve", filed Dec. 12, 2013, which is herein incorporated by reference in its entirety.

BACKGROUND

The subject matter disclosed herein relates to storage tanks and, more specifically, to pressure vacuum relief valves (e.g., vent valves) for storage tanks.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Storage tanks are frequently used to store industrial quantities of a variety of raw and finished materials. These storage tanks may contain liquids, gases, solids, or some combination thereof and are used in a variety of industries. For example, the oil and gas industry frequently uses above ground storage tanks to store refined hydrocarbon products. Additionally, storage tanks are also common in the petrochemical, pharmaceutical, cosmetics, food, and consumer products industries.

As appreciated, the liquids, gases, solids, or combination thereof within the storage tanks may vary in volume, pressure, and so forth. For example, a pressure within a storage tank may vary (e.g., increase and/or decrease) as solids, liquids, gases, or some combination thereof are added to the storage tank, removed from the storage tank, change in composition and/or state within the storage rank, and so forth. Accordingly, storage tanks may include openings designed to accept a venting device, such as a pressure vacuum relief valve or vent valve, which may enable regulation of a pressure inside the storage tank, while also providing a seal between the interior of the storage tank and an environment surrounding the storage tank. The pressure vacuum relief valve may provide a seal that blocks fluid communication between an interior of the storage tank and an exterior of the storage tank (e.g., environment) when an internal pressure within the interior of the storage tank is within a desired range. The pressure vacuum relief valve may also enable fluid communication when an internal pressure within the interior of the storage tank is not within the desired range. Unfortunately, typical pressure vacuum relief valves may have limited flow (e.g., pressure relief flow and/or vacuum relief flow) capacity. For example, a fluid flow path of a typical pressure vacuum relief valve may be tortuous and, therefore, may generate turbulence in the fluid flow, thereby decreasing the flow rate of the fluid flow through the pressure vacuum relief valve. Additionally, typical pressure vacuum relief valves may be susceptible to seal degradation, which can lead to leaks, undesired emissions, and so forth.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a system includes a pressure vacuum relief valve. The pressure vacuum relief valve includes a first end coupled to a storage container, and the first end includes a central opening configured to be exposed to an interior of the storage container. The pressure vacuum relief valve also includes a seal assembly disposed above the central opening and against a flanged seat. The seal assembly is configured to seal the central opening. The seal assembly includes a ribbed substrate disposed against the flanged seat of the pressure vacuum relief valve. The seal assembly also includes a pallet coupled to and disposed below the ribbed substrate. The ribbed substrate is configured to support one or more weights, and the pallet and the ribbed substrate are configured to move together away from the flanged seat. The pallet is also configured to seal against the ribbed substrate in a sealed position and pivot to an open position at an angle relative to the sealed position of the pallet.

In a second embodiment, a system includes a plurality of storage containers and a manifold fluidly coupled to each of the plurality of storage containers. The system also includes a pressure vacuum relief valve fluidly coupled to the manifold. The pressure vacuum relief valve includes a seal assembly configured to seal the manifold from an exterior environment. The seal assembly includes a ribbed substrate disposed against a flanged seat of the pressure vacuum relief valve and a pallet coupled to the ribbed substrate. The pallet is configured to seal against the ribbed substrate in a sealed position, and the pallet and the ribbed substrate are configured to move together away from the flanged seat when a pressure within the manifold exceeds a maximum threshold pressure. The pallet is also configured to pivot to an open position at an angle relative to the sealed position of the pallet when the pressure within the manifold falls below a minimum threshold pressure.

In a third embodiment, a seal assembly of a pressure vacuum relief valve includes a ribbed substrate disposed against a flanged seat of the pressure vacuum relief valve. The ribbed substrate includes ribs extending from a base of the ribbed substrate. The seal assembly also includes a pallet coupled to and disposed below the ribbed substrate. The pallet includes a top ring, a bottom ring, and a flexible diaphragm captured between the top ring and the bottom ring. The flexible diaphragm of the pallet is configured to seal against the ribbed substrate in a sealed position, and the pallet and the ribbed substrate are configured to move together away from the flanged seat when a pressure on a first sealed side of the pressure vacuum relief valve exceeds a maximum threshold pressure. The pallet is also configured to pivot to an open position at an angle relative to the sealed position of the pallet when the pressure on the first sealed side of the pressure vacuum relief valve falls below a minimum theshold pressure.

DRAWINGS

These and other features, aspects, and advantages of the present disclosure will become better understood when the following detailed description is read with reference to the accompanying drawings in which like characters represent like parts throughout the drawings, wherein:

FIG. 8 is a perspective view of an embodiment of a seal assembly of a pressure vacuum relief valve, in accordance with aspects of the present disclosure;

FIG. 9 is a perspective view of an embodiment of a seal assembly of a pressure vacuum relief valve, in accordance with aspects of the present disclosure;

DETAILED DESCRIPTION

Figure 1:
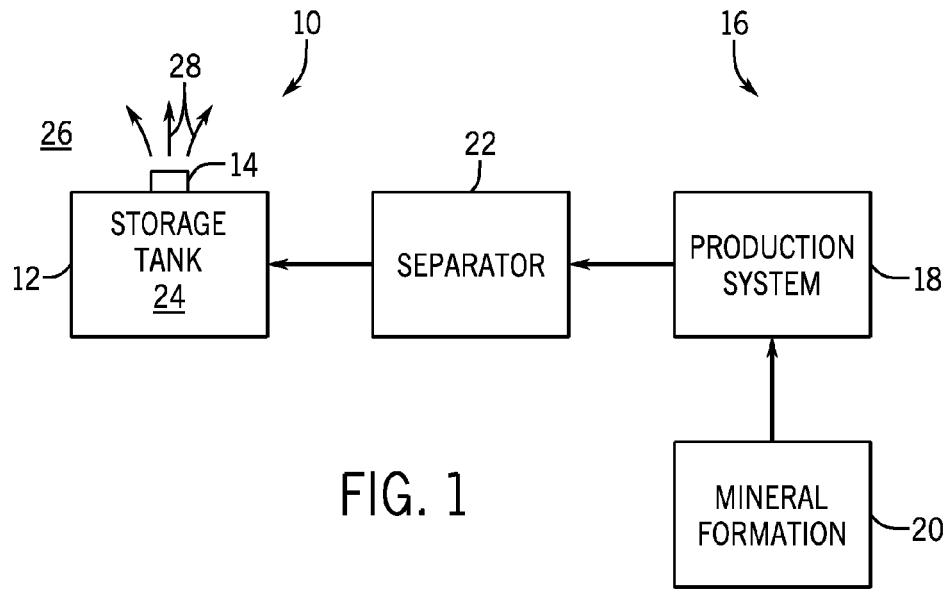
FIG. 1 is a schematic of an embodiment of a storage tank system having an end-of-line pressure vacuum relief valve, in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are directed toward an improved pressure vacuum relief valve (PVRV) or vent valve, such as may be used for a storage tank or storage tank system, although it may be used in other systems as well. A seal assembly of the PVRV may be configured to block fluid communication between an interior of the storage tank and an area external to the storage tank (e.g., a surrounding environment) when an internal pressure of the interior of the storage tank is within a desired range. The seal assembly may also be configured to enable fluid communication between the interior of the storage tank and the surrounding environment when the internal pressure in the interior of the PVRV is outside of the desired range. In particular, embodiments of the PVRV disclosed below may have a less tortuous fluid flow path to enable a reduction in turbulence of a fluid flowing through the PVRV during pressure venting and/or vacuum venting. The disclosed embodiments may include a seal assembly having improved (e.g., tighter) sealing capability, thereby reducing undesired leakage and emissions.

For example, in accordance with an embodiment of the present disclosure, a pallet (e.g., circular pallet) of the seal assembly of the PVRV may be configured to pivotally open (e.g., pivotally open downward) at an angle relative to the pallet's seal position when an internal pressure of the interior of the storage tank falls below a minimum pressure threshold (e.g., atmospheric pressure) of the PVRV. As such, the pallet of the PVRV may enable fluid communication (e.g., vacuum venting) between the interior of the storage tank and the surrounding environment during vacuum conditions, as described above. The pivoting action of the pallet may provide a less tortuous flow path as compared to pallets configured to only open vertically during vacuum venting. For example, the pivoting action of the pallet may provide a larger and/or more streamlined (e.g., centralized) flow path for a fluid flowing through the PVRV. Once pressure within the interior of the storage tank reaches or exceeds the desired minimum pressure threshold (e.g., atmospheric pressure), the pallet may return (e.g., pivot) to the previous seal position and seal the interior of the storage tank from the surrounding environment.

Additionally, the seal assembly of the PVRV, including the pallet, may lift vertically from the seal position of the seal assembly when the internal pressure of the interior of the storage tank exceeds a maximum pressure threshold of the PVRV. As such, the lifted pallet (and other components) may enable fluid communication (e.g., pressure venting) between the interior of the storage tank and the surrounding environment during pressure conditions as described above.

Embodiments of the PVRV (e.g., vent valve) disclosed below may be used in a variety of systems and system configurations. In certain embodiments, the PVRV may be an end-of-line PVRV, which may be configured to vent vapor or fluid from a storage tank into an environment surrounding the storage tank (e.g., the atmosphere), or an in-line PVRV, which may be configured to vent vapor or fluid from the storage tank into a flow line or component external to the storage tank. For example, FIG. 1 is a schematic of an embodiment of a storage tank system 10 having a storage tank 12 and an end-of-line pressure vacuum relief valve, or end-of-line PVRV 14 (e.g., a vent valve). As will be appreciated, the storage tank system 10 may be a component of a variety of applications. For example, the storage tank system 10 may be a component of a mineral recovery system 16, which includes a production system 18 configured to recover a mineral (e.g., oil and/or gas) from a mineral formation 20, such as a well. As the production system 18 recovers minerals from the mineral formation 20, the minerals recovered may be processed in a separator 22. Specifically, the separator 22 is designed to separate production fluids into their constituent components. For example, production fluids may be separated into oil, gas, fracking fluid, and water components. Thereafter, a constituent component or fluid separated by the separator 22 may be flowed into the storage tank 12 for storage.

When a fluid is stored in the storage tank 12, pressure may build within the storage tank 12 relative to a pressure outside of the storage tank 12. Alternatively, in some instances, pressure may build outside of the storage tank 12 relative to a pressure within the storage tank 12, or relative pressure within the storage tank 12 may decrease with respect to pressure outside of the storage tank. For example, the separator 20 may discharge the fluid for storage into the storage tank 12 at an elevated pressure. In certain embodiments, it may be desirable to vent or release pressures within an interior 24 of the storage tank 12 that are above a maximum pressure threshold. Similarly, when a pressure vacuum within the storage tank 12 is below a minimum threshold pressure, it may be desirable to enable fluid flow into the storage tank 12. As such, the storage tank 12 in the illustrated embodiment includes the end-of-line PVRV 14, which is configured to open to enable fluid communication between the interior 24 of the storage tank 12 and an environment 26 external to the storage tank 12. Once the internal pressure of the storage tank 12 falls below the maximum pressure threshold (e.g., during pressure venting) or rises above the minimum pressure threshold (e.g., during vacuum venting) the seal assembly of the PVRV 14 may automatically close and reseal, thereby blocking fluid communication between the interior 24 of the storage tank 12 and the external environment 26.

As described in detail below, present embodiments include the end-of-line PVRV 14 with a seal assembly configured to enable a less tortuous fluid flow path of the PVRV 14. For example, the PVRV 14 may have a seal assembly configured to reduce turbulence of fluid flow through the PVRV 14 during pressure and vacuum venting by creating a fluid flow path having a centralized cross-section and/or a large cross-sectional area. Additionally, as described below, the seal assembly may include seals (e.g., gaskets, O-rings, etc.) configured to increase sealing of the seal assembly.

Figure 2:
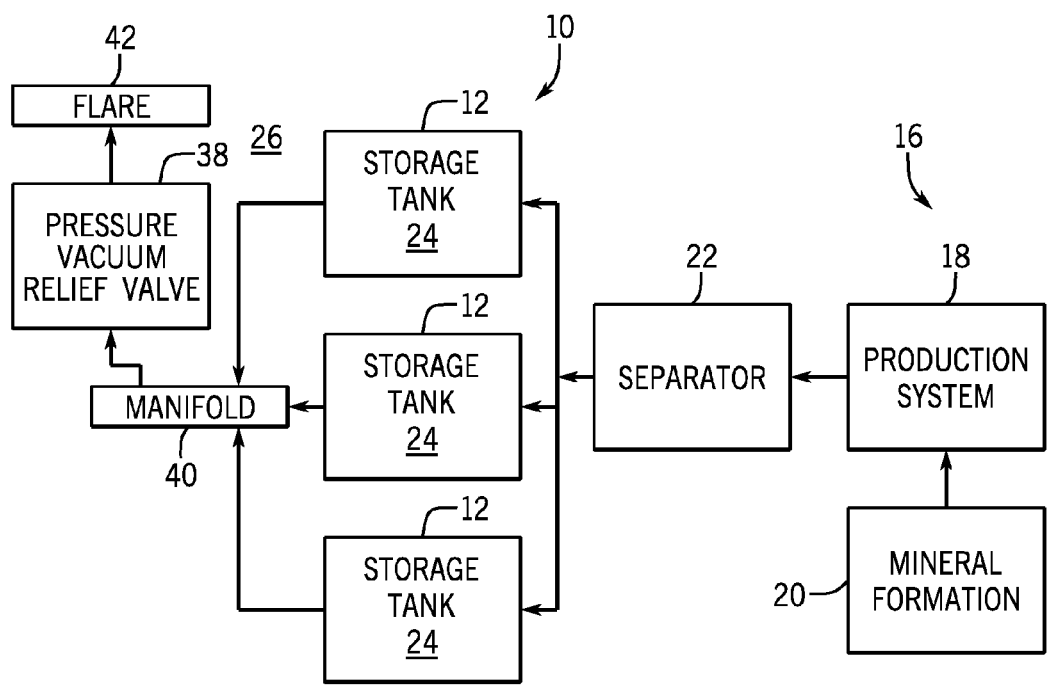
FIG. 2 is a schematic of an embodiment of a storage tank system having an in-line pressure vacuum relief valve, in accordance with aspects of the present disclosure.

In other configurations, the storage tank system 10 may include an in-line pressure vacuum release valve. For example, FIG. 2 illustrates an embodiment of the storage tank system 10 with an in-line PVRV 38. As similarly discussed above, the storage tank system 10 may be a component of a variety of applications. For example, the storage tank system 10 may be a component of the mineral recovery system 16, which includes the production system 18 configured to recover minerals from the mineral formation 20 and the separator 22 configured to process the recovered minerals.

In the illustrated embodiment, the storage tank system 10 includes three storage tanks 12, but may include more or less than three storage tanks 12. As shown in FIG. 2, the storage tanks 12 may be coupled to a single manifold 40 via pipe or conduit or some other coupling element, and the manifold 40 may be coupled via pipe or conduit or some other coupling element to the PVRV 38 (e.g., the in-line PVRV 38).

The manifold 40 may be configured to collect vapor or fluid from the interior 24 of each storage tank 12, or it may be used to distribute fluid to the interior 24 of each storage tank 12, or both. For example, in the illustrated embodiment, the interior 24 of each storage tank 12 is fluidly coupled to the manifold 40, such that the manifold 40 may collect vapor or fluid from the interior 24 of each storage tank 12. The manifold 40 may balance internal pressure of the interior 24 of each storage tank 12, such that the pressure within the interior 24 of each storage tank 12 is equal to or substantially equal to the pressure of the interior 24 of the each of the other storage tanks 12. In other words, the manifold 40 may regulate and/or maintain a pressure equilibrium across the respective interiors 24 of each of the storage tanks 12 in the storage tank system 10. For example, if pressure in the interior 24 of one of the storage tanks 12 increases, vapor or fluid may be distributed to the respective interiors 24 of the other storage tanks 12 by the manifold 40, thereby equalizing the pressure across the storage tanks 12.

Additionally, the manifold 40 is fluidly coupled to the in-line PVRV 38. Accordingly, in the illustrated embodiment, the PVRV 38 is in fluid communication with the interior 24 of each storage tank 12 via the manifold 40. Similar to the end-of-line PVRV 14, the PVRV 38 is configured to vent pressures and/or vacuums from the respective interiors 24 of the storage tanks 12. However, unlike the end-of-line PVRV 14, the in-line PVRV 38 does not enable fluid communication directly between the interiors 24 of the storage tanks 12 and the surrounding environment 26. Rather, the in-line PVRV 38 is configured to enable fluid communication between the interiors 24 of the storage tanks 12 and a flow line or component external to the storage tanks 12, such as a flare 42. As mentioned above, the manifold 40 enables pressure and/or vacuum equalization across the storage tanks 12. Accordingly, when a pressure or vacuum within the interior 24 of one of the storage tanks 12 increases, the pressure or vacuum may be distributed evenly or substantially evenly across all of the storage tanks 12. However, when a pressure or vacuum within all of the storage tanks 12 increases beyond a threshold, the in-line PVRV 38 may be configured to vent or release vapor or fluid from the manifold 40. That is, if a pressure within all of the storage tanks 12 increases beyond a maximum pressure threshold, the in-line PVRV 38 may enable fluid flow out of the manifold 40 and the storage tanks 12. If a pressure falls below a minimum pressure threshold, the PVRV 38 may enable fluid flow into the manifold 40 and the storage tanks 12.

As mentioned above and described in detail below, the in-line PVRV 38 may also include a seal assembly configured to enable a less tortuous fluid flow path of the PVRV 38. For example, the PVRV 38 may have a seal assembly configured to reduce turbulence of fluid flow through the PVRV 38 during pressure and vacuum venting by creating a fluid flow path having a centralized cross-section and/or a large cross-sectional area. Additionally, as described below, the seal assembly may include seals (e.g., gaskets, O-rings, etc.) configured to increase sealing of the seal assembly.

It should be noted that the in-line PVRV 38 shown in FIG. 2 may be used in a storage tank system 10 which includes only one storage tank 12. In other words, the in-line PVRV 38 may be used to fluidly couple one storage tank 12 and a flow line or component external to the storage tank 12, such as the flare 42. Additionally, multiple in-line PVRVs 38 may be used in a storage tank system 10 which includes multiple storage tanks 12, where each storage tank 12 is coupled to an individual PVRV 38. Accordingly, the manifold 40 may not be included in certain embodiments. In other words, the PVRV 38 may be coupled directly to the storage tank 12, such that the pallet of the PVRV 38 may be exposed to vapor pressure directly from the interior 24 of the storage tank 12, as opposed to the manifold 40 as described above.

Figure 3:
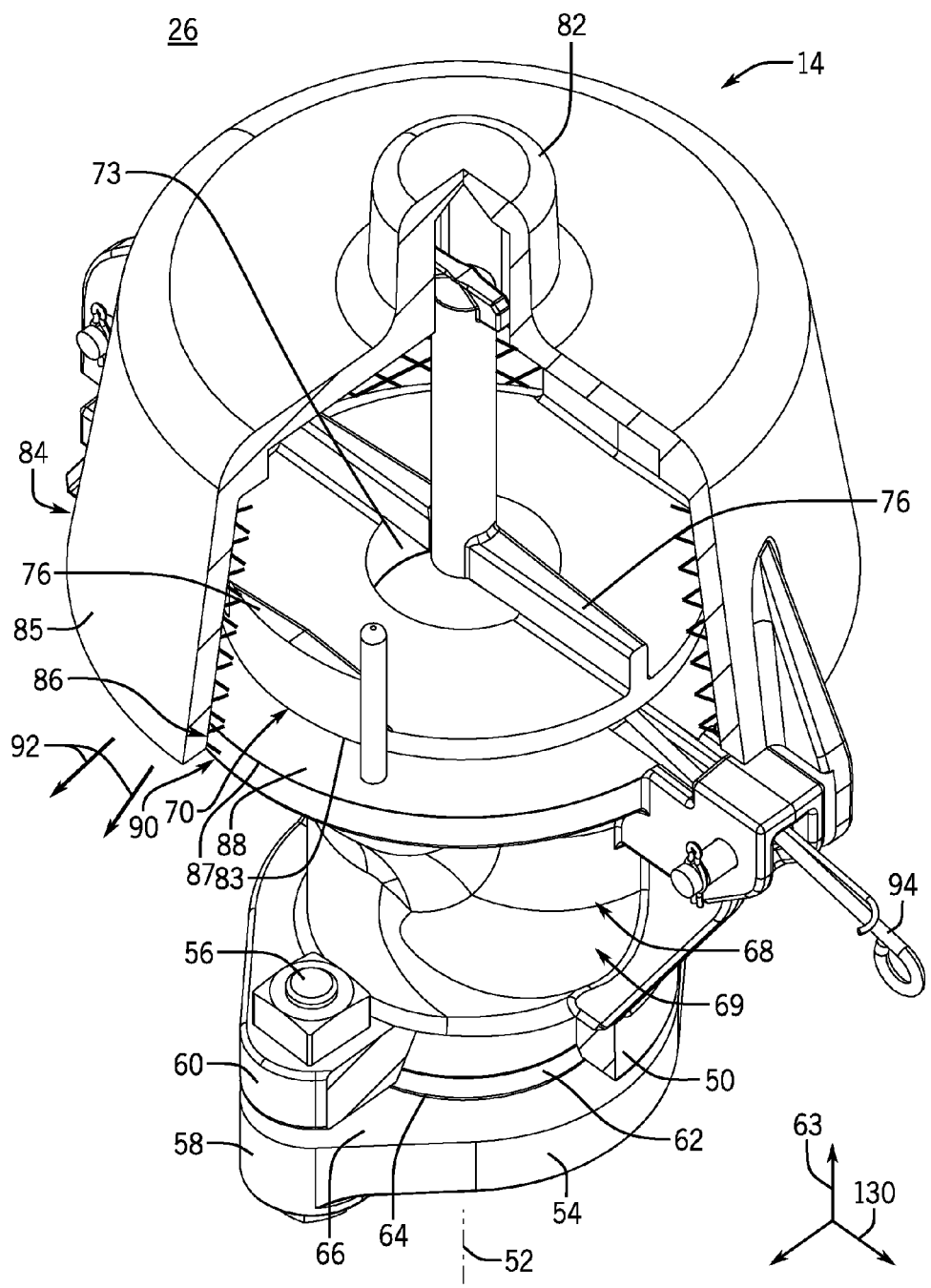
FIG. 3 is a partial cut-away perspective view of an embodiment of the end-of-line pressure vacuum relief valve of FIG. 1, in accordance with aspects of the present disclosure.

As mentioned above, the PVRV (e.g., the end-of-line PVRV 14 and the in-line PVRV 38) may have a variety of components, such as a seal assembly, a pallet, a ribbed substrate, and so forth. For example, FIG. 3 is a partial cut-away perspective view of an embodiment of the end-of-line PVRV 14, illustrating certain components of the PVRV 14. In the illustrated embodiment, the PVRV 14 includes a first circumferential end 50 centered on longitudinal axis 52. The first circumferential end 50 may be coupled to a valve flange 54 below the first circumferential end 50 via bolts 56. The valve flange 54 and the first circumferential end 50 may both be circular in shape, centered on longitudinal axis 52, with circular extrusions or apertures configured to receive the bolts 56 (e.g., valve flange extrusions 58 and end extrusions 60, respectively). A gasket 62 may be disposed between the first circumferential end 50 and the valve flange 54, and may also be circular in shape. The gasket 62 may enable sealing between the first circumferential end 50 and the valve flange 54, such that fluid and/or vapor may be blocked from escaping between the first circumferential end 50 and the valve flange 54.

The valve flange 54 may be coupled to a pipe or conduit fluidly coupled to an opening in the storage tank 12 (not shown). The pipe, conduit, or a portion of the storage tank 12 extruded from the storage tank 12 may include a lip extrusion that fits between the valve flange 54 and the first circumferential end 50 of the PVRV 14 (e.g., captured between the valve flange 54 and the first circumferential end 50 and against the gasket 62), such that the pipe, conduit, or portion of the storage tank 12 extending from the opening in the storage tank 12 extends through the valve flange 54 (e.g., in a direction 63), and the lip extrusion extends radially outward (e.g., away from longitudinal axis 52) beyond an inner radius 64 of the valve flange 54 to contact a circumferential surface 66 of the valve flange 54. In another embodiment, the pipe, conduit, or a flange disposed around an opening in the storage tank 12 may extend into the valve flange 54 and be coupled to the valve flange 54 or the first circumferential end 50 of the PVRV 14 in some other manner (e.g., friction fit, welding, brazing, adhesive, etc.). In a further embodiment, the valve flange 54 may be a component of the storage tank 12, or the valve flange 54 may be a part of the pipe or conduit fluidly coupled to the storage tank 12. In such an embodiment, the storage tank 12 and the PVRV 14 may be coupled directly to each other via the bolts 56 coupling the first circumferential end 50 and the valve flange 54, as previously described. It should be noted that other modifications and alternatives regarding the connection(s) between the components discussed above may occur to those skilled in the art, and such modifications and alternatives fall within the scope of the present disclosure.

Above the first circumferential end 50 (i.e., in direction 63 above the first circumferential end 50), a vapor collection area 68 within the PVRV 14 may collect fluid or vapor from the interior 24 of the storage tank 12. The PVRV 14 may bulb outwards and upwards to form a bulb enclosure 69 from the first circumferential end 50, such that the vapor collection area 68 is within the bulb enclosure 69 and may have a greater radial cross-sectional area than the first circumferential end 50 and/or the valve flange 54. As will be appreciated, the greater radial cross-sectional area of the bulb enclosure 69 may increase the cross-sectional area of a fluid flow path within the PVRV 14, thereby reducing turbulence of a fluid flowing through the PVRV 14.

Figure 4:
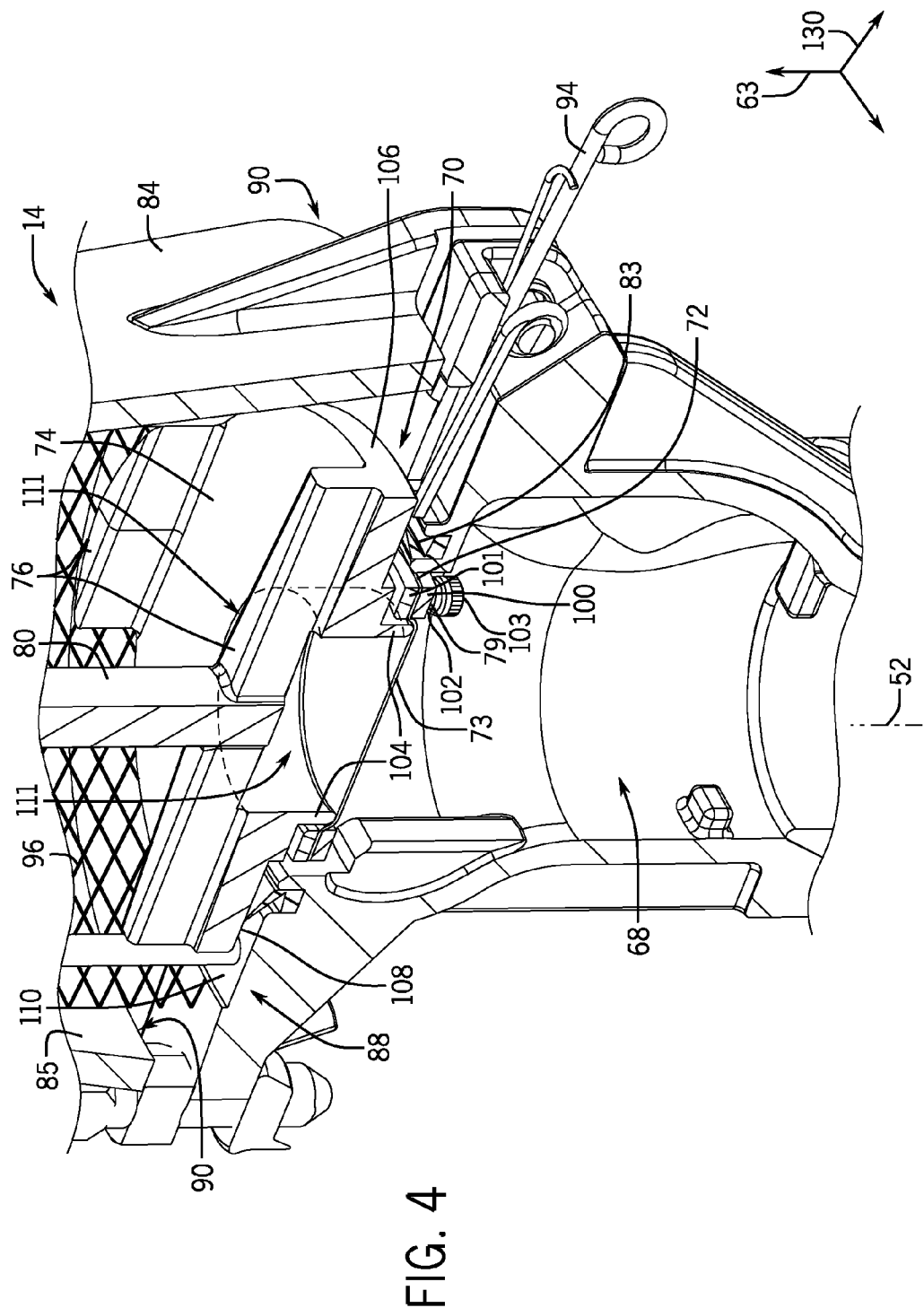
FIG. 4 is a partial cross-sectional perspective view of an embodiment of the end-of-line pressure vacuum relief valve of FIG. 1, in accordance with aspects of the present disclosure.

The vapor collection area 68 is disposed below a seal assembly 70 of the PVRV 14. Referring to FIGS. 3 and 4, the seal assembly 70 includes a pallet 72 (e.g., a circular pallet) and a diaphragm 73 of the circular pallet 72. The seal assembly 70 also includes a ribbed substrate 74 (e.g., a circular ribbed substrate) with ribs 76, where the ribbed circular substrate 74 is disposed above the pallet 72 and diaphragm 73. Also included in the seal assembly 70 are weights 78, guide bolts 79, a spring 102 disposed around each guide bolt 79, a piston 80 coupled to the ribbed circular substrate 74 and extending through the pallet 72, and a seal ring 83.

As mentioned above, the seal assembly 70 enables pressure and vacuum venting in certain conditions. For example, as described below, elements of the seal assembly 70 (e.g., the pallet 72 and the diaphragm 73) may block fluid communication between the interior 24 of the storage tank 12 and the environment 26 during certain pressure conditions (e.g., when the internal pressure of the interior 24 of the storage tank 12 is within a desired range), and may enable fluid communication between the interior 24 of the storage tank 12 and the environment 26 during other pressure conditions (e.g., when the internal pressure of the interior 24 of the storage tank 12 is not within the desired range).

When pressure conditions actuate the seal assembly 70 to vent a pressure or vacuum (e.g., when vapor pressure within the interior 24 of the storage tank 12 is above the maximum pressure threshold or below the minimum pressure threshold), fluid communication may be enabled between the interior 24 of the storage tank 12 and the surrounding environment 26. For example, during vacuum venting, vapor may pass from the environment 26 through a gap 90 in the PVRV 14 and into a bell enclosure 84 of the PVRV 14 disposed above the seal assembly 70. When relative pressure within the interior 24 of the storage tank 12 falls below the minimum pressure threshold (e.g., atmospheric pressure), the seal assembly 70 will open and the vapor in the bell enclosure 84 of the PVRV 14 (and, thus, from the environment 26) may pass through the seal assembly 70, into the vapor collection area 68 under the seal assembly 70, and into the interior 24 of the storage tank 12. The seal assembly 70 may enable vacuum venting until the internal pressure in the interior 24 of the storage tank 12 exceeds the minimum pressure threshold.

Similarly, when vapor pressure within the interior 24 of the storage tank 12 exceeds the maximum pressure threshold, vapor may escape from the interior 24 of the storage tank 12 through the vapor collection area 68, through the seal assembly 70, into the bell enclosure 84 of the PVRV 14, and out into the environment 26. As indicated above, the bell enclosure 84 of the end-of-line PVRV 14 is above the seal assembly 70 and may be exposed the environment 26. The seal assembly 70 and the bell enclosure 84 will be described in further detail below.

In the illustrated embodiment, the bell enclosure 84 is disposed above both the seal assembly 70 and the vapor collection area 68. A conical wall 85 defining the bell enclosure 84 may have an inner diameter 86 greater than an outer diameter 87 of a flanged pressure seat 88 of the PVRV 14 above the vapor collection area 68 to enable the bell enclosure 84 to be disposed about the flanged pressure seat 88. In another embodiment, the conical wall 85 of the bell enclosure 84 may be disposed above the flanged pressure seat 88 and offset from the flanged pressure seat 88 in the direction 63. In either configuration, the PVRV 14 may include a gap 90 disposed between the conical wall 85 of the bell enclosure 84 and the flanged pressure seat 88, such that the gap 90 exposes an interior of the bell enclosure 84 to the environment 26. As a result, the gap 90 between the bell enclosure 84 and the flanged pressure seat 88 enables fluid communication (as indicated by pressure relief arrows 92) between the environment 26 and the interior of the bell enclosure 84 (e.g., above the seal assembly 70 of the PVRV 14).

In general terms, fluid communication between the environment 26 and the interior 24 of the storage tank 12 may be enabled when the seal assembly 70 below the bell enclosure 84 is opened or actuated. As mentioned above, the seal assembly 70 may be opened or actuated when the seal assembly 70 is exposed to pressure from vapor within the vapor collection area 68 that is either above the maximum pressure threshold or below the minimum pressure threshold (e.g., atmospheric pressure) of the PVRV 14. Additionally, the PVRV 14 may include a manual vent pin 94, which may be accessed by an operator external to the PVRV 14, to enable manual actuation of the seal assembly 70. The seal assembly 70 of the end-of-line PVRV 14 and its components will be discussed in detail below with reference to FIG. 4.

The components of the seal assembly 70 are shown in detail in the cross-sectional perspective view of FIG. 4. As mentioned above, the seal assembly 70 includes the circular pallet 72, the diaphragm 73 of the circular pallet 72, the ribbed circular substrate 74 (with ribs 76) above the circular pallet 72, guide bolts 79, and the piston 80 configured to be received by a top bulb 82 (not shown) near a top of the bell enclosure 84, and the seal ring 83. In addition to the seal assembly 70, the PVRV 14 in the illustrated embodiment includes a mesh 96 disposed conically or cylindrically within the conical wall 85 of the bell enclosure 84. The mesh 96 may be included to block contaminants or debris from the environment 26 from entering into the bell enclosure 84 (e.g., block birds nesting inside the bell enclosure 84).

As mentioned above, the seal assembly 70 includes the circular pallet 72 and the diaphragm 73. Specifically, the circular pallet 72 may include two rings: a bottom ring 100 and a top ring 101. The bottom and top rings 100 and 101 are centered on longitudinal axis 52 (e.g., concentric with one another) and are stacked one on top of the other (e.g., the top ring 101 stacked on top of the bottom ring 100). The diaphragm 73 may be made of a flexible material and may have a circular shape such that a radially outer area of the diaphragm 73 is captured between the bottom ring 100 and the top ring 101. As shown, the circular pallet 72 and the diaphragm 73 cooperatively form a solid disk, with a flexible inner portion (e.g., the diaphragm 73) that is exposed to the vapor collection area 68 of the PVRV 14.

The circular pallet 72 is biased upwardly in the direction 63 into a sealing engagement with the ribbed circular substrate 74 via springs 102 disposed about each guide bolt 79. Specifically, the guide bolts 79 extend through slots or openings in the circular pallet 72 and couple to the ribbed circular substrate 74. Each of the springs 102 is captured between the bottom ring 100 of the circular pallet 72 and a retaining feature 103 (e.g., a cap or nut) of one of the guide bolts 79. In other words, the spring 102 of each guide bolt 79 may be retained between the bottom ring 100 of the circular pallet 72 and the retaining feature 103 disposed on an end of the guide bolt 79 below the circular pallet 72. Accordingly, the spring 102 may exert a force against the bottom ring 100 of the circular pallet 72, such that the circular pallet 72 is biased upwardly in direction 63 against the ribbed circular substrate 74. The sealing engagement between the circular pallet 72 and the ribbed circular substrate 74 is described in further detail below.

The ribbed circular substrate 74 of the seal assembly 70, which is disposed above the circular pallet 72, contacts the diaphragm 73 via a circumferential extension 104 of the ribbed circular substrate 74. As shown, the circumferential extension 104 of the ribbed circular substrate 74 extends downwardly and opposite direction 63. As mentioned above, the diaphragm 73 may be a flexible material. The flexible construction of the diaphragm 73 enables the circumferential extension 104 of the ribbed circular substrate 74 to press the diaphragm 73 downwardly, opposite direction 63. As a result, the diaphragm 73 and the circumferential extension 104 may more completely engage with one another for an improved sealing interface between the diaphragm 73 and the ribbed circular substrate 74. In this manner, leakage of vapor or fluid from the interior 24 of the storage tank 12 into the environment 26 may be reduced.

As shown, the circumferential extension 104 may extend downwardly from a base disk 106 of the ribbed circular substrate 74. Additionally, a bottom surface 108 of the base disk 106 may contact a top surface 110 of the flanged pressure seat 88 above the vapor collection area 68 to create a sealing engagement. In other words, the base disk 106 may contact, and seal against, the top surface 110 of the flanged pressure seat 88 above the vapor collection area 68, while the circumferential extension 104 seals against the diaphragm 73 of the circular pallet 72.

The base disk 106 of the ribbed circular substrate 74 may also include a circular opening or cylindrical area 111 above the diaphragm 73 (e.g., the diaphragm 73 of the circular pallet 72, which is sealed against the ribbed circular substrate 74, as previously described). The cylindrical area 111 enables exposure of vapor or fluid from the environment 26 to the diaphragm 73 (e.g., by way of the bell enclosure 84 being exposed to the environment 26 via the gap 90, as described above). The cylindrical area 111 may be beneath the ribs 76 of the ribbed circular substrate 74, and the weights 78 (not shown) may be on top of the ribs 76. Accordingly, vapor or fluid from the environment may enter into the cylindrical area 111 from beneath the weights 78 (e.g., due to open space between each rib 76 of the ribbed circular substrate 74). As such, the diaphragm 73 may be exposed to a pressure difference between vapor or fluid from the environment 26 (e.g., in the cylindrical real 111 above the diaphragm 73) and vapor from the interior 24 of the storage tank 12 (e.g., collected in the vapor collection area 68 below the diaphragm 73).

When pressure from the vapor in the interior 24 of the storage tank 12 (e.g., vapor in the vapor collection area 68) is below the maximum pressure threshold and above the minimum pressure threshold, the circular pallet 72 (e.g., the diaphragm 73) is sealed against the circumferential extension 104 of the base disk 106 of the ribbed circular substrate 74. Additionally, the ribbed circular substrate 74 is sealed via contact between the bottom surface 108 of the base disk 106 of the ribbed circular substrate 74 and the top surface 110 of the flanged pressure seat 88. However, when the pressure of vapor in the vapor collection area 68 exceeds the maximum pressure threshold or falls below the minimum pressure threshold (e.g., atmospheric pressure), the seal assembly 70 may vent until pressure in the interior 24 of the storage tank 12 is above the minimum pressure threshold and/or below the maximum pressure threshold. For example, the seal assembly 70 may actuate to create a fluid flow path within the PVRV 14 configured to reduce turbulence of a vapor or fluid flowing through the PVRV 14. In particular, the fluid flow path created through the seal assembly 70 may have a large and/or centralized cross-sectional area. The operation of the seal assembly 70 during pressure venting and/or vacuum venting is described in detail below.

Figure 5:
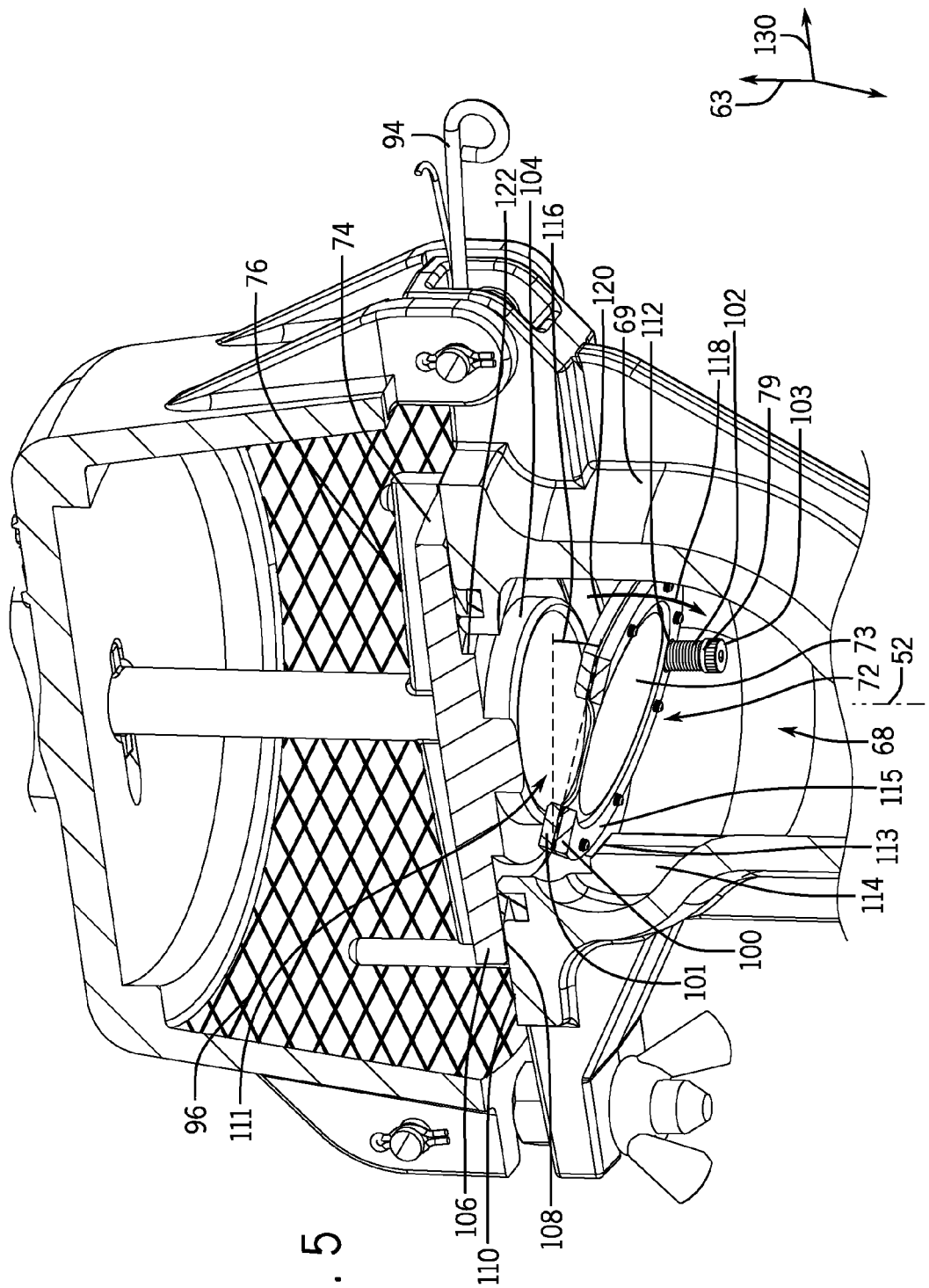
FIG. 5 is a partial cross-sectional perspective view of an embodiment of the end-of-line pressure vacuum relief valve of FIG. 1, in accordance with aspects of the present disclosure.

When the pressure from vapor or fluid in the cylindrical area 111 above the diaphragm 73 is greater than pressure of vapor collected in the vapor collection area 68 below the diaphragm 73, the circular pallet 72 of the seal assembly 70 may actuate (e.g., pivot open) to enable vacuum venting. That is, when a pressure from vapor collected in the vapor collection area 68 (e.g., from the interior 24 of the storage tank 12) is below a minimum pressure threshold (e.g., atmospheric pressure), vacuum venting of the seal assembly 70 may be enabled. For example, FIG. 5 illustrates the seal assembly 70 of the end-of-line PVRV 14 in a vacuum venting position (e.g., an open position). Specifically, the force of the springs 102 disposed about the guide bolts 79, which bias the circular pallet 72 (e.g., the diaphragm 73) upwardly against the circumferential extrusion 104, are overcome by pressure experienced by the diaphragm 73 from the vapor in the cylindrical area 111. As a result, the diaphragm 73 may be forced downwardly and away from the circumferential extension 104. Thus, the diaphragm 73 and the circular pallet 72 move downward, in a direction opposite direction 63. During this movement, the circular pallet 72 is guided by the guide bolts 79 (one shown in FIG. 5), each of which extend through a tapered, or slotted, opening 112 in the circular pallet 72.

As the circular pallet 72 is forced downwardly due to a pressure difference experienced by the diaphragm 73, as described above, the circular pallet 72 contacts an angled surface 113 of an extrusion 114 extending radially into the vapor collection area 68. Accordingly, a bottom surface 115 of the bottom ring 100 of the circular pallet 72 may contact the angled surface 113 of the extrusion 114, thereby enabling the circular pallet 72 to pivot open at an angle 116 relative to the horizontal seal position of the circular pallet 72 (e.g., circumferentially centered on the longitudinal axis 52). The circular pallet 72 may pivot at the angle 116 described above while the guide bolts 79 guide the circular pallet 72 due to the tapered, or slotted, openings 112 through which each guide bolt 79 extends. That is, the tapered openings 112 have contours or geometries that are configured to enable pivoting of the circular pallet 72 at the angle 116 about the angled surface 113 of the extrusion 114. For example, the contours of the tapered openings 112 enable variable angular orientations of the guide bolts 79 relative to the circular pallet 72. Thus, the circular pallet 72 may pivot open at the angle 116 while the guide bolts 79 are fixed and remain parallel to the longitudinal axis 52. As will be appreciated, the pivoting movement of the circular pallet 72 may enable less tortuous flow of vapor from the cylindrical area 111 to the vapor collection area 68 compared to circular pallets 72 that merely translate axially along the longitudinal axis 52. For example, the pivoting movement of the circular pallet 72 enables the creation of a fluid flow path from the cylindrical area 111 to the vapor collection area 68 having a large, streamlined (e.g., centralized) cross-sectional area as compared to circular pallets 72 configured to only translate vertically without pivoting, which may create a tortuous, decentralized fluid flow path. As a result, the PVRV 14 may enable faster, more efficient vacuum venting.

Figure 6:
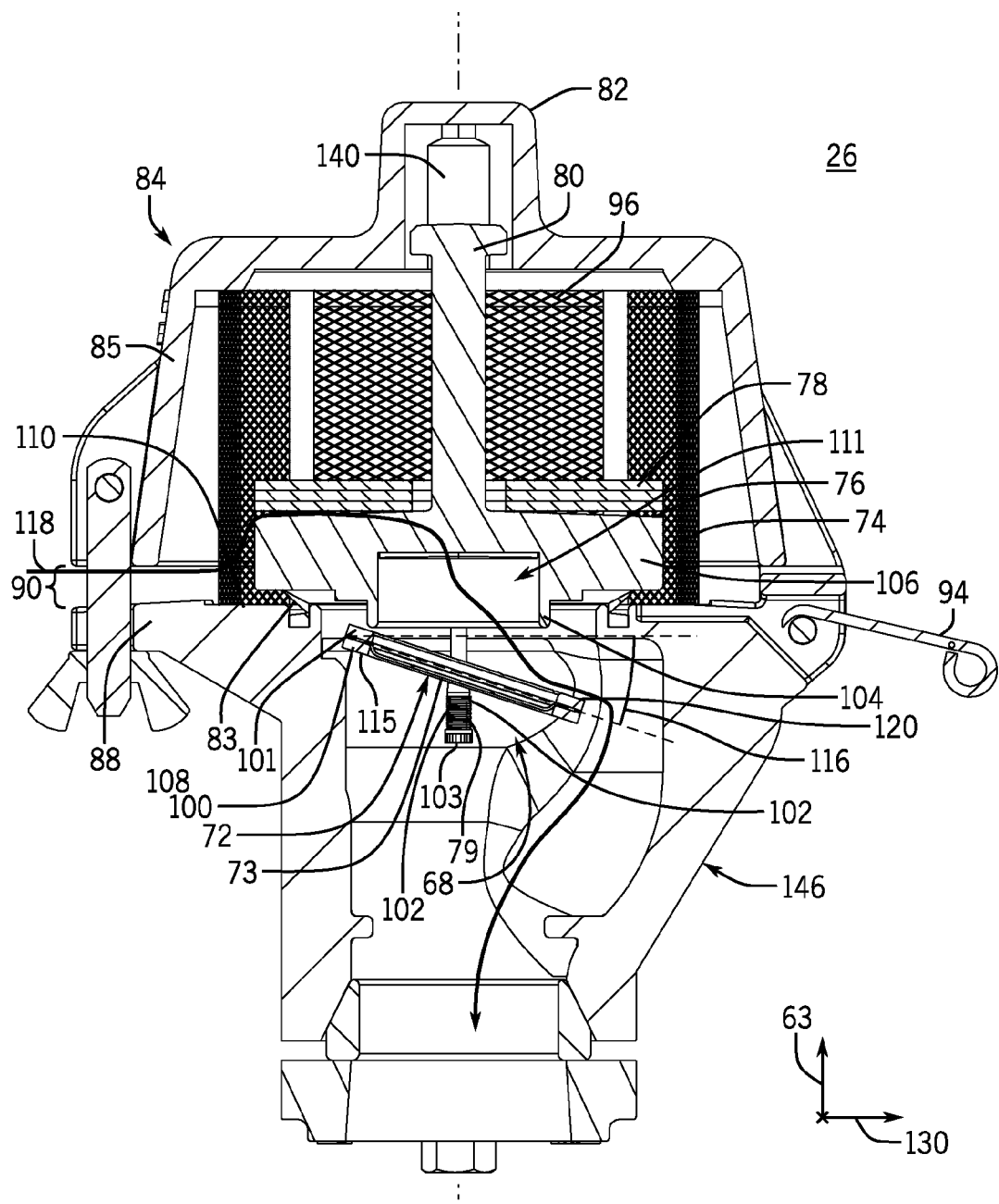
FIG. 6 is a cross-sectional side view of an embodiment of the end-of-line pressure vacuum relief valve of FIG. 1, in accordance with aspects of the present disclosure.

The PVRV 14 may include other features to enable improved vacuum venting. For example, FIG. 6 is a cross-sectional view of an embodiment of the PVRV 14 is shown with the seal assembly 70 in a vacuum vent configuration. In this embodiment, as similar discussed in detail above, pressure in the vapor collection area 68 (e.g., under the diaphragm 73) is below the minimum pressure threshold (e.g., atmospheric pressure) of the PVRV 14. Accordingly, pressure from above the diaphragm 73 (e.g., in the cylindrical area 111) may overcome a biasing force of the springs 102 against the bottom ring 100 of the circular pallet 72, and the circular pallet 72 may be forced downwardly opposite direction 63. Specifically, in the manner described above, the circular pallet 72 pivots at the angle 116 relative to the circular pallet's 72 seal position. When the circular pallet 72 is pivoted open, vapor or fluid may flow from the environment 26, through the gap 90, under the weights 78 (e.g., through openings between each rib 76), through the cylindrical area 111, over the diaphragm 73 and the circular pallet 72, into the vapor collection area 68, and into the interior 24 of the storage tank 12, as indicated by the flow arrow 118.

In the illustrated embodiment, the bulb enclosure 69 of the vapor collection area 68 extends radially outward from the central longitudinal axis 52 on one side (e.g., in direction 130 in the illustrated embodiment) more so than another side. In other words, a cross-section of the bulb enclosure 69 taken perpendicularly to the longitudinal axis 52 may not be perfect circle. Rather, the bulb enclosure 69 may be ovular on one side or larger on one side. The ovular or larger side (e.g., the side in direction 130 from the longitudinal axis 52 in the illustrated embodiment and indicated by arrow 146) may correspond to a side of the circular pallet 72 that opens at the angle 116 as previously described. In other words, fluid flow from the environment 26 may enter into the vapor collection area 68 on the ovular, or larger, side 146 of the vapor collection area 68. As a result, the fluid flow path may have a larger cross-sectional area and may be less tortuous than fluid flow in other configurations (e.g., when the circular pallet 72 does not pivot open) where the fluid flow path into the vapor collection area 68 of the bulb enclosure 69 may have sharp turns, narrow clearances between components, a de-centralized cross-sectional area, and so forth.

When the circular pallet 72 is in the position shown in FIG. 6, vapor or fluid from the cylindrical area 111 above the diaphragm 73 (and, thus, from the bell enclosure 84 and the environment 26) may flow into the vapor collection area 68 (and, thus, into the interior 24 of the storage tank 12 coupled to the end-of-line PVRV 14), as indicated by arrow 118. Once pressure in the interior 24 of the storage tank 12 exceeds the minimum pressure threshold, the pressure within the interior 24 of the storage tank 12 and the biasing force of the springs 102 about the guide bolts 79 may force the diaphragm 73 and the circular pallet 72 upwardly in direction 63, away from the extrusion 114. Accordingly, the diaphragm 73 may re-engage with the circumferential extension 104 of the ribbed circular substrate 74, thereby sealing the seal assembly 70. Furthermore, when the seal assembly 70 is sealed against the ribbed circular substrate 74, a top surface 120 of the top ring 101 of the circular pallet 72 may also contact an extruded portion 122 of the bottom surface 108 of the base disk 106 of the ribbed circular substrate 74. The extruded portion 122 of the bottom surface 108 may extend downwardly opposite direction 63 from the base disk 106, as indicated in the illustrated embodiment. In another embodiment, the bottom surface 108 may be flush or level across the base disk 106, and therefore may not include the extruded portion 122. In such an embodiment, the bottom surface 108 may contact the top surface 120 of the top ring 101 when the seal assembly 70 is in the sealed positioned.

Figure 7:
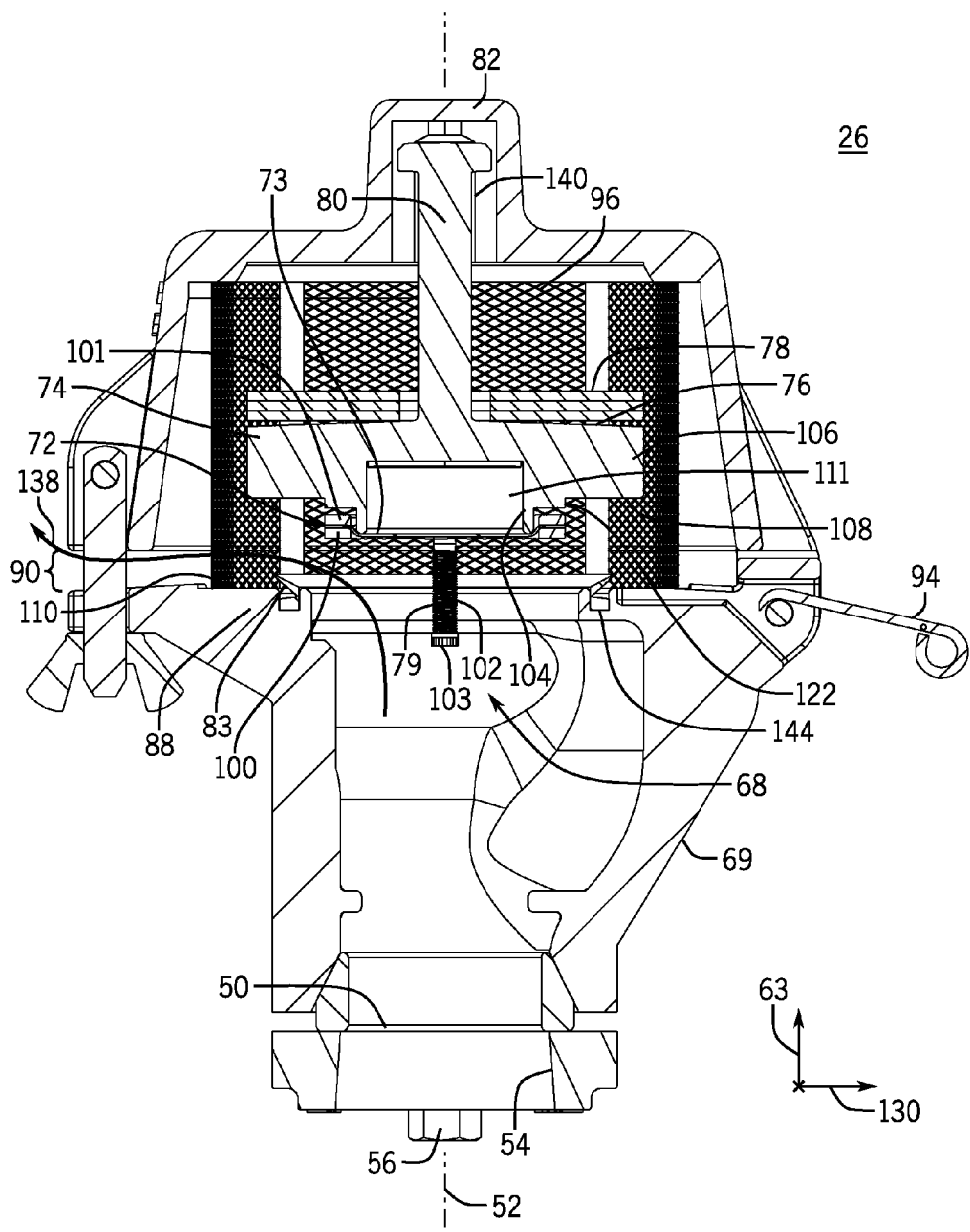
FIG. 7 is a cross-sectional side view of an embodiment of the end-of-line pressure vacuum relief valve of FIG. 1, in accordance with aspects of the present disclosure.

When the pressure from vapor collected in the vapor collection area 68 below the diaphragm 73 is greater than a maximum pressure threshold, the seal assembly 70 may actuate to enable pressure venting. For example, an embodiment of the end-of-line PVRV 14 during pressure venting from within the interior 24 of the storage tank 12 to the environment 26 is shown in the cross-sectional illustration of FIG. 7. In the illustrated embodiment, pressure from within the vapor collection area 68 and, thus, the interior 24 of the storage tank 12, has exceeded a maximum pressure threshold of the PVRV 14. The value of the maximum pressure threshold of the PVRV 14 may be defined or determined by the number of weights 78 positioned on top of the ribbed circular substrate 74 (e.g., positioned on top of the ribs 76 of the ribbed circular substrate 74). In other words, adding more weights 78 may increase the maximum pressure threshold value of the PVRV 14, and removing weights 78 may decrease the maximum pressure threshold value of the PVRV 14.

As previously discussed, the diaphragm 73 of the circular pallet 72 may be exposed to a pressure difference between vapor pressure in the vapor collection area 68 below the diaphragm 73 and vapor pressure in the cylindrical area 111 above the diaphragm 73. When pressure below the diaphragm 73 (e.g., the internal pressure of the interior 24 of the storage tank 12) exceeds the maximum pressure threshold of the PVRV 14, the top surface 120 of the top ring 101 of the circular pallet 72 may contact and exert a force on the extruded portion 122 of the bottom surface 108 of the base disk 106 of the ribbed circular substrate 74. Additionally, the pressure within the vapor collection area 68 may exert a force directly on the extruded portion 122 and/or the bottom surface 108 of the base disk 106. Accordingly, the pressure of the vapor within the vapor collection area 68 may force the ribbed circular substrate 74 with the weights 78 upwardly in direction 63, thereby enabling vapor or fluid from inside the vapor collection area 68 and the interior 24 of the storage tank 12 to flow into the bell enclosure 84, through the gap 90, and into the environment 26, as indicated by flow arrow 138.

During the pressure venting action described above, the piston 80 coupled to the ribbed circular substrate 74 is also forced upwardly in direction 63 into a cylindrical piston area 140 of the top bulb 82. As such, the cylindrical piston area 140 of the top bulb 82 may guide the piston 80 and, thus, the circular ribbed substrate 74 coupled to the piston 80, in the direction 63. When pressure from the interior 24 of the storage tank 12 falls below the maximum pressure threshold of the PVRV 14 (e.g., as determined by the weights 78), the circular pallet 72, the ribbed circular substrate 74, and the weights 78 may move downwardly opposite direction 63 and eventually re-engage with the flanged pressure seat 88 to seal the PVRV 14.

In addition to components of the seal assembly 70 described above, the seal ring 83 (e.g., an annular, flexible seal ring) may generate a seal between the bottom surface 108 of the base disk 106 of the ribbed circular substrate 74 and the top surface 110 of the flanged pressure seat 88 of the PVRV 14. The seal ring 83 may be located adjacent to the top surface 110 of the flanged pressure seat 88 in a crevice or annular recess 144 and may have a sideways V-shaped configuration. When the bottom surface 108 of the base disk 106 contacts the V-shaped seal ring 83, the seal ring 83 may flex downwardly opposite direction 63 until the bottom surface 108 contacts the top surface 110 of the flanged pressure seat 88 of the PVRV 14. As such, the seal ring 83 may function as an additional seal or gasket that further creates a sealing engagement between the circular ribbed substrate 74 and the flanged pressure seat 88.

The seal assembly 70 may include additional features to increase and/or centralize the cross-sectional area of a fluid flow path through the PVRV 14. For clarity, the seal assembly 70 is shown in isolation in the perspective views of FIGS. 8 and 9. In FIG. 8, the seal assembly 70 is in a pressure vent configuration (e.g., pressure within the interior 24 of the storage tank 12 is in excess of the maximum pressure threshold of the PVRV 14). As shown in the illustrated embodiment, the ribs 76 of the ribbed circular substrate 74 are spaced apart such that openings 150 separate and extend between each rib 76. Thus, vapor or fluid from the environment 26 may enter into the bell enclosure 84 via the gap 90 in the PVRV 14, and flow under the weights 78 supported by the ribs 76. Accordingly, the vapor or fluid can enter into cylindrical area 111 above the diaphragm 73 through the openings 150, rather than through an annulus between the piston 80 and the weights 78 or through other narrow crevices between the weights 78 and the ribbed circular substrate 74.

In the illustrated embodiment, the pressure difference experienced by the diaphragm 73 (and the bottom ring 100 of the circular pallet 72) forces the circular pallet 72 upwardly in direction 63. As the diaphragm 73 is in contact with the circumferential extension 104 of the ribbed circular pallet 74 and the top ring 101 is in contact with the extruded portion 122 of the ribbed circular pallet 74, the ribbed circular pallet 74 is also forced upwardly in direction 63. As the ribbed circular pallet 74 moves upwardly, the interior 24 of the storage tank 12 (by way of the vapor collection area 68) is exposed to the bell enclosure 84 and, thus, to the environment 26. Thus, the seal assembly 70, in the pressure venting condition described above, enables fluid communication between the interior 24 of the storage tank 12 and the environment 26.

A perspective view of the seal assembly 70 in a vacuum venting configuration in FIG. 9. As similarly described above, in the illustrated embodiment, a pressure difference between the environment 26 and the vapor collection area 68 is experienced by the diaphragm 73, and the pressure within the interior 24 of the storage tank 12 is below a minimum pressure threshold (e.g., atmospheric pressure) of the PVRV 14. As such, the atmospheric pressure from the environment 26 may overcome a spring force exerted on the bottom ring 100 of the circular pallet 72 by the springs 102, and force the circular pallet 72 downwardly. Specifically, as the circular pallet 72 is forced downward by the pressure difference across the circular pallet 72 (e.g., the diaphragm 73), the circular pallet 72 contacts the angled surface 113 of the extrusion 114. Contact between the bottom ring 100 of the circular pallet 72 and the angled surface 113 of the extrusion 114 enables the circular pallet 72 to pivot open at the angle 116.

As shown in the illustrated embodiment, downward movement of the circular pallet 72 is also guided by the guide bolts 79. As discussed above, the guide bolts 79 may be cylindrical, and the circular pallet 72 may include the tapered openings 112 for each cylindrical guide bolt 79. The contours of the tapered openings 112 enable the circular pallet 72 to rotate or pivot relative to the guide bolts 79 and about the angled surface 113 of the extrusion 114 at the angle 116. As discussed in detail above, the pivoting action of the circular pallet 72 creates a fluid flow path between the cylindrical area 111 and the vapor collection area 68 having a large, centralized cross-sectional area compared to circular pallets 72 that may merely translate downward and vertically without pivoting.

Figure 10:
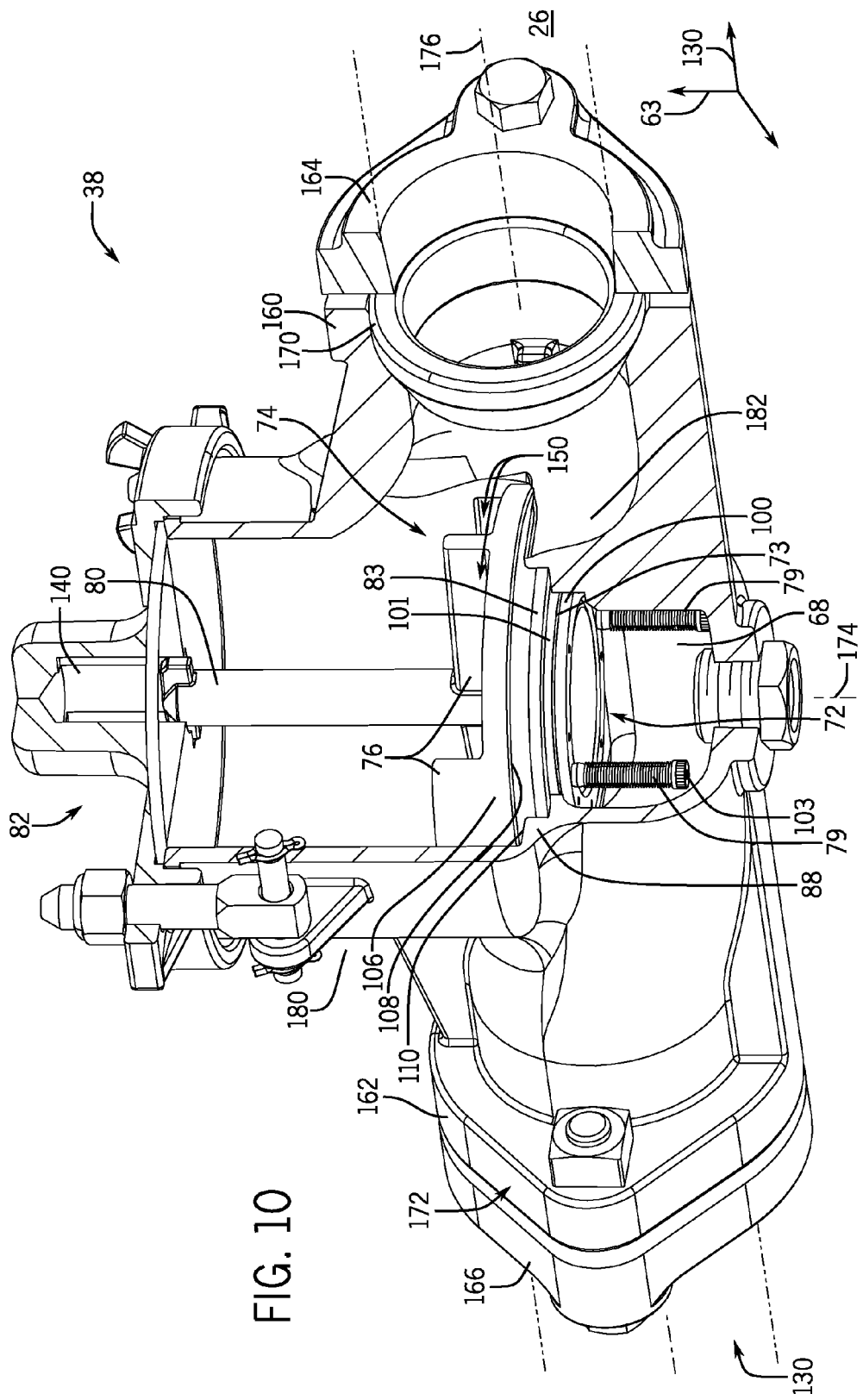
FIG. 10 is a partial cut-away perspective view of an embodiment of the in-line pressure vacuum relief valve of FIG. 2, in accordance with aspects of the present disclosure.

Embodiments of the seal assembly 70 described above with respect to the end-of-line PVRV 14 may also be incorporated with the in-line PVRV 38 described in FIG. 2. For example, an embodiment of the in-line PVRV 38 is illustrated in a partial cut away perspective view in FIG. 10. The in-line PVRV 38, as previously described, may be coupled to pipe or conduit or some other coupling mechanism on both ends (e.g., a first circumferential end 160 and a second circumferential end 162). The first and second circumferential ends 160 and 162 may be coupled to valve flanges 164 and 166, respectively. As with the end-of-line PVRV 14, the in-line PVRV 38 may includes gaskets between each circumferential end 160 and 162 and valve flange 164, 166 connection (e.g., gaskets 170 and 172). Pipe or conduit may couple to either valve flange 164, 166 via a friction fit, welding, mechanical fastener(s), or adhesive. In another embodiment, pipe may extend through either valve flange 164, 166 and extend radially outward into a gap between the respective valve flange 164, 166 and circumferential end 160, 166. Thus, the radial extension of the pipe may be captured between the valve flange 164, 166 and circumferential end 160, 166 and pressed against the respective gasket 170, 172. It should be noted that other modifications, changes, and alternatives regarding the connection(s) described above between the storage tank 12, the valve flanges 164, 166, the circumferential ends 160, 162, and the pipe or conduit coupled to each end may occur to those skilled in the art. Such modifications, changes, and alternatives are considered to be within the scope of the present disclosure.

In the illustrated embodiment, the in-line PVRV 38 includes the vapor collection area 68 and the seal assembly 70, where the seal assembly 70 includes guide bolts 79 with springs 102, the circular pallet 72 including the top ring 101, the bottom ring 100, and the diaphragm 73, the ribbed circular substrate 74 with ribs 76, and the piston 80. For clarity, the weights 78 of the seal assembly 70 are not shown. As previously described, the diaphragm 73 may be disposed between the top ring 101 and the bottom ring 100 of the circular pallet 72. The circular pallet 72 may be sealed against the ribbed circular substrate 74 (e.g., the circumferential extrusion 104) due to a spring force exerted by springs 102 against the bottom ring 100 of the circular pallet 72, as previously described.

The diaphragm 73 of the circular pallet 72 may experience a pressure from vapor in the vapor collection area 68 below the diaphragm 73 and vapor in the cylindrical area 111 above the diaphragm 73. As discussed in detail above, when the relative pressure below the diaphragm 73 is within a desired range (e.g., above the minimum pressure threshold, such as atmospheric pressure, and below the maximum pressure threshold), the seal assembly 70 seals the interior 24 of the storage tank 12 from the environment 26. In certain embodiments, the seal assembly 70 may seal the interiors 24 of the storage tanks 12 from the environment 26 by way of sealing the manifold 40 (FIG. 2) coupled to the interior 24 of each pressure tank 12 from the environment 26. In other words, in certain embodiments, the PVRV 38 may be coupled to the single manifold 40, as previously described with respect to FIG. 2, and the manifold 40 may be coupled to the respective interior 24 of each storage tank 12, thereby providing fluid communication between the PVRV 38 and the respective interior 24 of each storage tank 12. Therefore, seal assembly 70 of the PVRV 38 may experience a collective pressure or vacuum from the interiors 24 of the storage tanks 12. In this way, the manifold 40 and the PVRV 38 may vent and balance pressure in each of the storage tanks 12 to maintain equilibrium (e.g., a pressure equilibrium) across the interiors 24 of the storage tanks 12 within the minimum and maximum pressure thresholds.

In the illustrated embodiment, the seal assembly 70 may be centered on a vertical axis 174, while a horizontal axis 176 of the PVRV 38 may extend through the first and second circumferential ends 160 and 162. The first and second circumferential ends 160 and 162 and the respective valve flanges 164, 166 may be centered on the horizontal axis 176. However, in other embodiments, the first and second circumferential ends 160 and 162 may be offset from the horizontal axis 176 and/or one another. Pipe or conduit may also extend from either circumferential end 160, 162 along the horizontal axis 176. The second circumferential end 162 and/or valve flange 166 may receive a pipe coming from the manifold 40 (e.g., the manifold 40 that is fluidly coupled to the respective interior 24 of each storage tank 12). Thus, vapor may travel from the manifold 40 in direction 130 and enter the vapor collection area 68 beneath the circular pallet 72.

The first circumferential end 160 and/or a conduit or pipe coupled to the first circumferential end 160 may be exposed to the environment 26 or to another component external to the storage tanks 12, such as an external pipe or the flare 42. Accordingly, vapor or fluid may travel from the environment 26 or other external component through the first circumferential end 160 into a cylindrical top 180 of the PVRV 38. The cylindrical top 180 of the in-line PVRV 38 may be similar to bell enclosure 84 of the end-of-line PVRV 14 in that the cylindrical top 180 may house the ribbed circular substrate 74, the piston 80, and the top bulb 82. The cylindrical top 180 may also have the cylindrical piston area 140 configured to guide the piston 80 and the ribbed circular substrate 74 during pressure venting. In certain embodiments, a mesh for blocking contamination (e.g., birds nesting) may be disposed within the cylindrical top 180, as similarly described above.

Vapor may travel from the environment 26 and/or external component through the circumferential end 160 and over an internal or vertical wall 182 of the PVRV 38. In the illustrated embodiment, the internal wall 182 includes a portion of the flanged pressure seat 88 of the PVRV 38 that seals against the ribbed circular substrate 74. The internal wall 182 guides the vapor from the environment 26 to an internal volume of the cylindrical top 180 of the PVRV 38 and blocks the vapor from entering the vapor collection area 68 below the seal assembly 70. Once the vapor or fluid flows over the internal wall 182, the vapor may enter into the internal volume cylindrical top 180. Thereafter, the vapor may travel through the openings 150 between the ribs 76, under the weights 78 of the ribbed circular substrate 74, and into the cylindrical opening 111 above the diaphragm 73. As discussed above, the openings 150 beneath the ribs 76 provide a greater, more centralized fluid flow path for the vapor compared to other configurations where the weights 78 may be disposed direction on top of the base disk 106 of the ribbed circular substrate 74.

Figure 11:
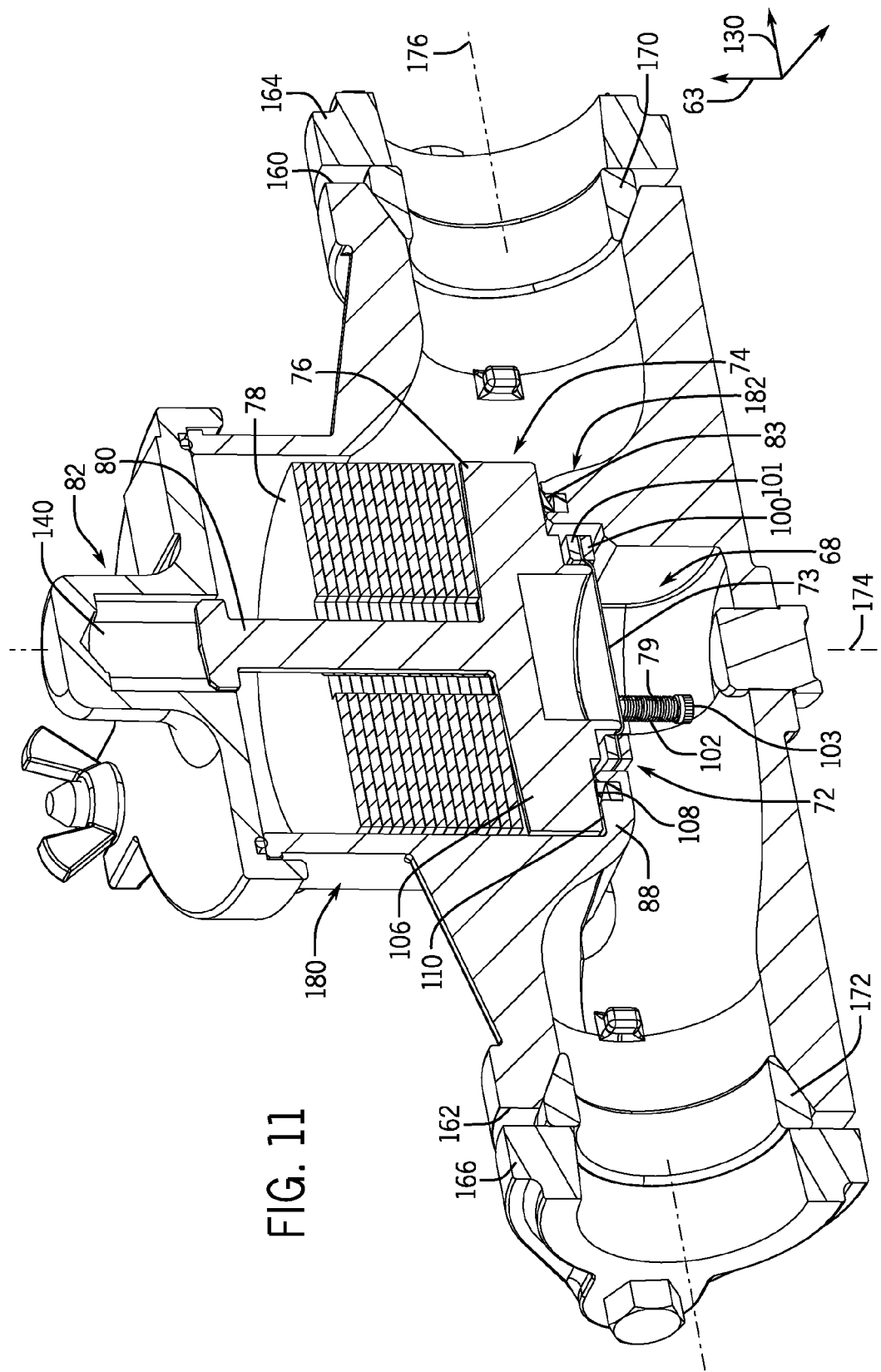
FIG. 11 is a cross-sectional perspective view of an embodiment of the in-line pressure vacuum relief valve of FIG. 2, in accordance with aspects of the present disclosure.

A cross-sectional perspective view of an embodiment of the in-line PVRV 38 is shown in FIG. 11. In the illustrated embodiment, the circular pallet 72 (e.g., the diaphragm) of the seal assembly 70 is sealed against the circumferential extension 104 of the ribbed circular substrate 74 above the circular pallet 72. As described above, the circular pallet 72 and the diaphragm 73 are biased against the circumferential extension 104 by the springs 102 disposed about the guide bolts 79. Additionally, as the diaphragm 73 may be made from a flexible material, pressure from within the vapor collection area 68 may cause the diaphragm 73 to flex upwards to further engage with the circumferential extension 104. In this manner, the sealing engagement between the circular pallet 72 and the ribbed circular substrate 74 may be enhanced. The top surface 120 of the top ring 101 of the circular pallet 72 may also be sealed against the extruded portion 122 of the bottom surface 108 of the base disk 106 of the ribbed circular substrate 74. Accordingly, the illustrated embodiment shows an example of when the pressure of vapor below the diaphragm 73 of the circular pallet 72 (e.g., in the vapor collection area 68) is within the desired range (e.g., above a minimum pressure threshold, such as atmospheric pressure, and below a maximum pressure threshold).

Figure 12:
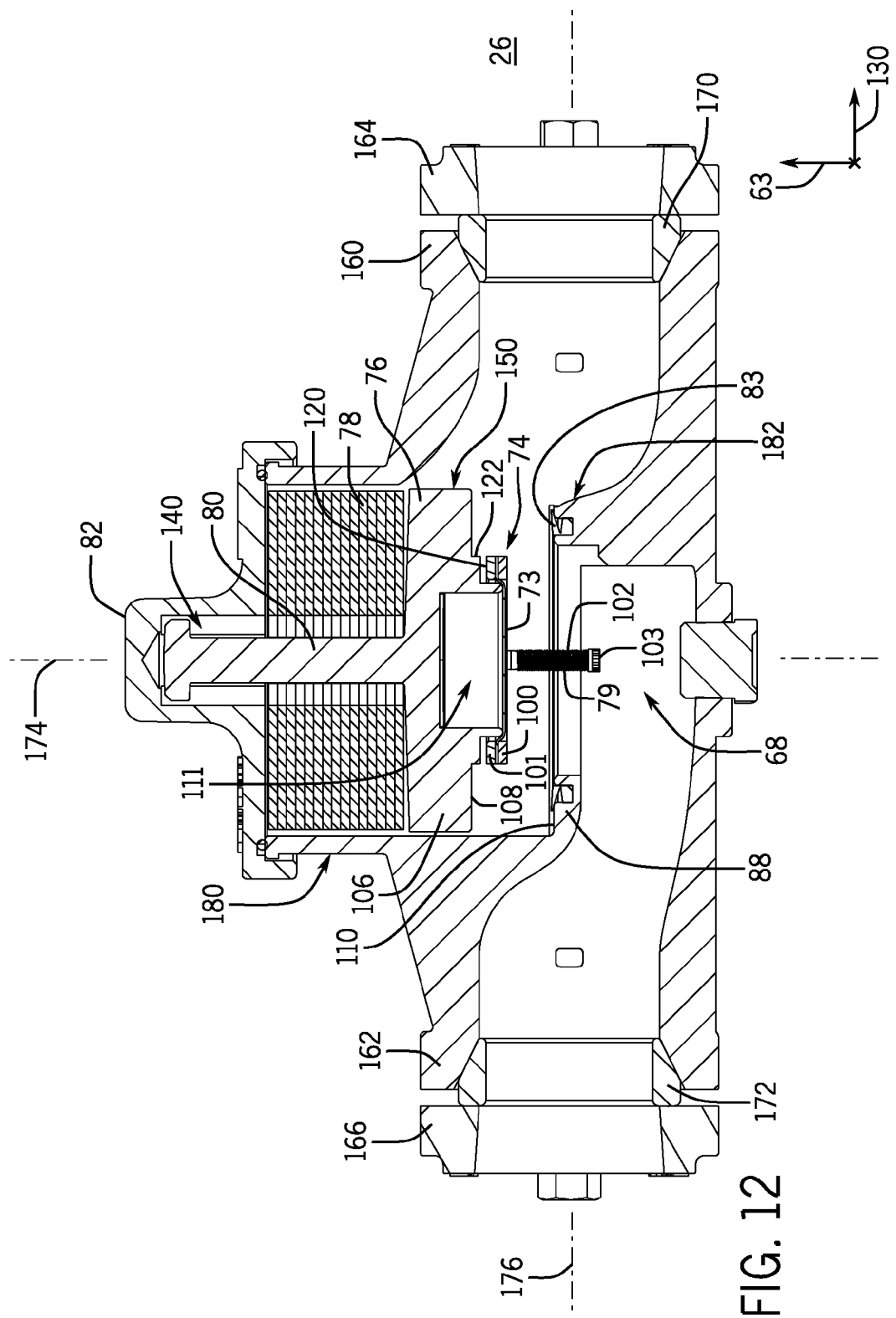
FIG. 12 is a cross-sectional side view of an embodiment of the in-line pressure vacuum relief valve of FIG. 2, in accordance with aspects of the present disclosure.

During pressure venting, in-line PVRV 38 (e.g., the sealing assembly 70) may operate in a manner similar to the end-of-line PVRV 14 described above. For example, FIG. 12 illustrates a cross-sectional view of an embodiment of the in-line PVRV 38 during pressure venting. As similarly described above, during pressure venting, the diaphragm 73 experiences a pressure from vapor collected in the vapor collection area 68 that exceeds a maximum pressure threshold of the PVRV 38. The maximum pressure threshold value may be partially determined or defined by the number of weights 78 that is positioned on the ribs 76 of the ribbed circular substrate 74. When the pressure of the vapor within the vapor collection area 68 exceeds the maximum pressure threshold, the diaphragm 73 and the circular pallet 72 are forced upwardly in direction 63 against the ribbed circular substrate 74 bearing the weights 78. Specifically, the diaphragm 73 may be forced against the circumferential extension 104 of the ribbed circular substrate 74, and the top surface 120 of the top ring 101 of the circular pallet 72 may be forced against the extruded portion 122 of the bottom surface 108 of the ribbed circular substrate 74. As the circular pallet 72 and the ribbed circular substrate 74 are lifted by the pressure of the vapor within the vapor collection area 68, the seal between the ribbed circular substrate 74 (e.g., the bottom surface 108 of the base disk 106 of the ribbed circular substrate 74) and the top surface 110 of the flanged pressure seat 88 is broken. Thus, the vapor in the vapor collection area 68 may flow in direction 130 between the circular pallet 72 and internal wall 182 (e.g., over the internal wall 182 and under the circular pallet 72) and into the environment 26 or other area external to the storage tank system 10. Once pressure below the diaphragm 73 of the circular pallet 72 (e.g., the vapor in the vapor collection area 68 from the manifold 40) falls below the maximum pressure threshold, the weights 78 may cause the circular pallet 72 and ribbed circular substrate 74 to move downwardly (e.g., along vertical axis 174 opposite direction 63) to re-seal against the flanged pressure seat 88 of the PVRV 38. As a result, the manifold 40 (and, thus, the respective interior 24 of each storage tank 12 of the storage tank system 10) may be sealed via the seal assembly 70 from the environment 26, thereby blocking fluid communication between the two.

Figure 13:
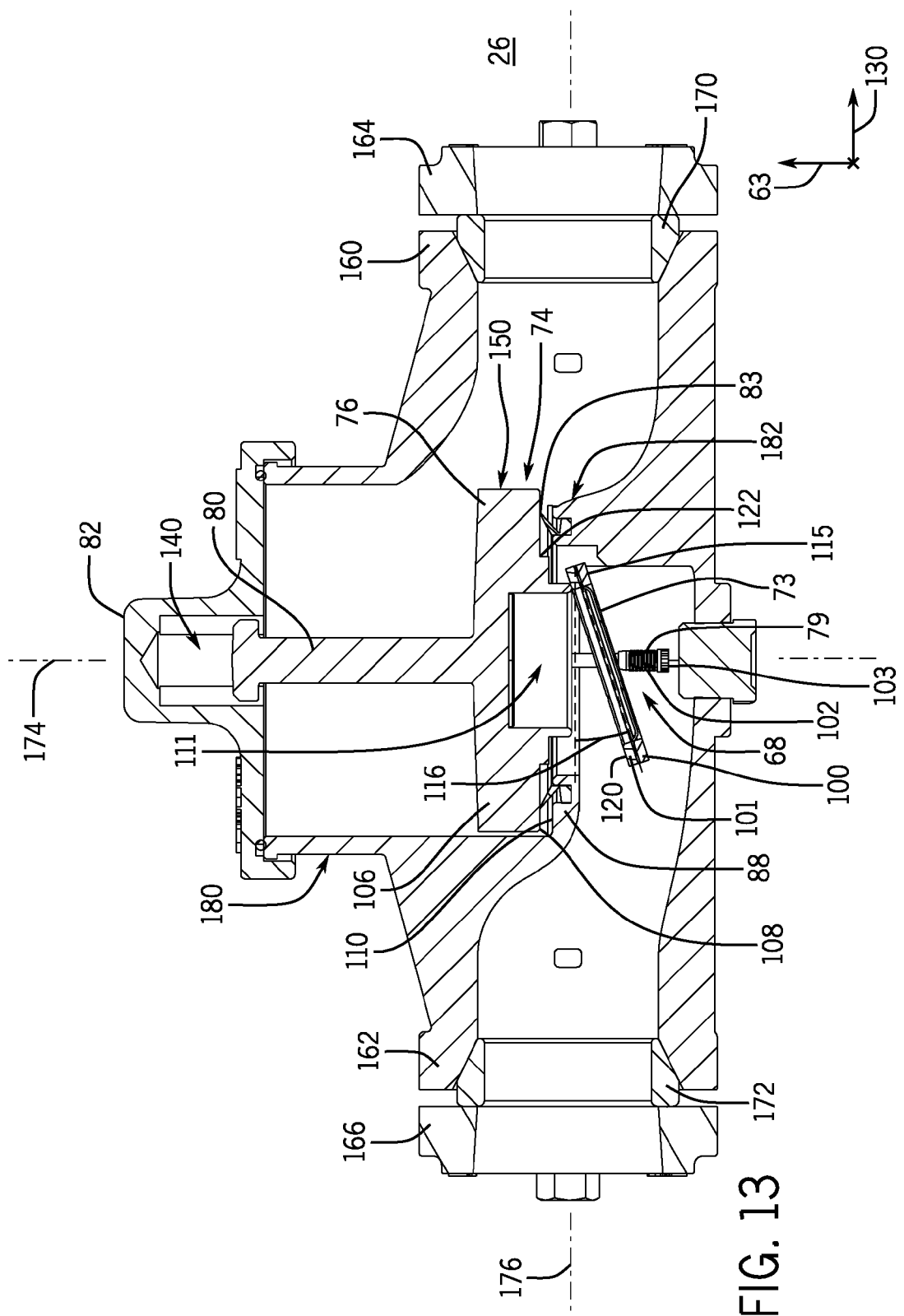
FIG. 13 is a cross-sectional side view of an embodiment of the in-line pressure vacuum relief valve of FIG. 2, in accordance with aspects of the present disclosure.

During vacuum venting, in-line PVRV 38 may also operate in a similar manner as the end-of-line PVRV 14 described above. For example, in FIG. 13, a cross-sectional view of an embodiment of the in-line PVRV 38 during vacuum venting is shown. As previously described, the diaphragm 73 may experience a pressure difference between vapor collected in the vapor collection area 68 and vapor within the cylindrical area 111 when the vapor in the vapor collection area 68 is below a minimum pressure threshold of the PVRV 38 (e.g., atmospheric pressure). In such a circumstance, pressure from above the diaphragm 73 (e.g., vapor pressure within the cylindrical area 111) may overcome a spring force from the springs 102 exerted on the bottom ring 100 of the circular pallet 72. Accordingly, the diaphragm 73 and the circular pallet 72 may be forced downwardly, opposite direction 63, and away from the ribbed circular substrate 74 by the vapor pressure within the cylindrical area 111.

As described above, during actuation of the circular pallet 72, a portion of the bottom surface 115 of the bottom ring 100 of the circular pallet 72 may contact the angled surface 113 of the extrusion 114 in the vapor collection area 68. As such, the angled surface 113 of the extrusion 114 may block movement of the portion of the circular pallet 72, as pressure from the environment 26 on the diaphragm 73 forces the circular pallet 72 downwardly, opposite direction 63. As shown, the portion of the circular pallet 72 that is not contacted by the angled surface 113 of the extrusion 114 continues to move downwardly, such that the circular pallet 72 pivots open at the angle 116. The pivoting action of the circular pallet 72 enables the creation of a fluid flow path with a large, centralized cross-sectional area, which enables a reduction of turbulence in the fluid flow. The circular pallet 72 may be guided downwardly via the guide bolts 79, each of which extends through one of the slotted or tapered openings 112. As discussed above, the slotted or tapered openings 112 are contoured to enable the circular pallet 72 to pivot open at the angle 116. Specifically, the slotted or tapered openings 112 enable the circular pallet 72 to pivot at an angle relative to the guide bolts 79, which remain vertically fixed. As the circular pallet 72 pivots open at the angle 116, fluid communication is enabled between the environment 26 and the manifold 40 (and, thus, the respective interior 24 of each storage tank 12). Thus, vapor from the environment 26 may flow opposite direction 130 as the vapor travels from the environment 26, through the openings 150 between the ribs 76 of the ribbed circular substrate 74 (e.g., under the weights 78, as previously described), into the cylindrical area 111 above the diaphragm 73, across the diaphragm 73, into the vapor collection area 68, into the manifold 40, and into the interior 24 of each storage tank 12.

Once pressure below the diaphragm 73 of the circular pallet 72 (e.g., the vapor pressure in the vapor collection area 68 fluidly coupled to the manifold 40) rises above the minimum pressure threshold, the circular pallet 72 may move and pivot upwardly due to the spring force exerted by the springs 102 against the bottom ring 100 of the circular pallet 72. In this manner, the circular pallet 72 may re-seal against the circumferential extension 104 of the ribbed circular substrate 74. Additionally, the top surface 120 of the top ring 101 of the circular pallet 72 may re-seal against the extruded portion 122 from the bottom surface 108 of the base disk 106 of the ribbed circular substrate 74. Thus, the manifold 40 (and, thus, interior 24 of each storage tank 12 of the storage tank system 10) may again be sealed via the seal assembly 70 from the environment 26, thereby blocking fluid communication between the manifold 40 and the environment 26.

As described in detail above, embodiments of the present disclosure are directed toward a pressure vacuum relief valve (PVRV) for a storage tank 12. For example, in certain embodiments, the PVRV 14, 38 includes the circular pallet 72 of the seal assembly 70 configured to pivot open at the angle 116 during vacuum venting (e.g., when pressure in the vapor collection area 68 below the diaphragm 73 of the circular pallet 72 is below a minimum pressure threshold of the PVRV 14, 38). The pivoting action of the circular pallet 72 enables the creation of a fluid flow path through the seal assembly 70 that has a large, centralized cross-sectional area. The centralized cross-sectional area of the fluid flow path enables a reduction in turbulence of a fluid flowing through the PVRV 14, 38. Additionally, the circular pallet 72 may be forced upwardly against the ribbed circular substrate 74 during pressure venting, such that the ribbed circular substrate 74 is lifted away from a sealing engagement with the flanged pressure seat 88 of the PVRV 14, 38. During either vacuum venting or pressure venting, fluid communication is enabled between the environment 26 and the interior 24 of one or more storage tanks 12. Further, the seal assembly 70 of the PVRV is configured to re-seal once pressure in the interior 24 of the one or more storage tanks 12 returns within a desired range (e.g., above a minimum pressure threshold and below a maximum pressure threshold).

While the disclosure may be susceptible to various modifications and alternative forms, specific embodiments have been shown by way of example in the drawings and have been described in detail herein. However, it should be understood that the embodiments provided herein are not intended to be limited to the particular forms disclosed. Rather, the various embodiments may cover all modifications, equivalents, and alternatives falling within the spirit and scope of the disclosure as defined by the following appended claims. Further, it should be understood that certain elements of the disclosed embodiments may be combined or exchanged with one another.

The invention claimed is:

1. A system, comprising:
a pressure vacuum relief valve, comprising:
 a first end configured to be coupled to a storage container, wherein the first end comprises a central opening configured to be exposed to an interior of the storage container;
 a flanged seat; and
 a seal assembly disposed above the central opening and against the flanged seat, wherein the seal assembly is configured to seal the central opening, and the seal assembly comprises:
  a ribbed substrate disposed against the flanged seat of the pressure vacuum relief valve; and
  a pallet coupled to and disposed below the ribbed substrate,
 wherein the ribbed substrate is configured to support one or more weights, the pallet seals against the ribbed substrate in a sealed position, the pallet pivots to an open position at an angle relative to the sealed position of the pallet when a pressure within the interior of the storage container falls below a minimum threshold pressure, and the pallet and the ribbed substrate move together away from the flanged seat when the pressure within the interior of the storage container exceeds a maximum threshold pressure,
 wherein the first end comprises an extrusion that extends into the central opening, wherein the extrusion comprises an angled contact surface that contacts the pallet and causes the pallet to pivot to the open position when the pressure within the interior of the storage container falls below the minimum threshold pressure.

2. The system of claim 1, wherein a number of the one or more weights is selected based on a desired value of the maximum threshold pressure.

3. The system of claim 1, wherein the pallet comprises a top ring, a bottom ring, and a flexible diaphragm captured between the top ring and the bottom ring.

4. The system of claim 3, wherein the flexible diaphragm engages a circumferential extrusion of the ribbed substrate when the pallet is in the sealed position.

5. A system, comprising:
a pressure vacuum relief valve, comprising:
 a first end configured to be coupled to a storage container, wherein the first end comprises a central opening configured to be exposed to an interior of the storage container;
 a flanged seat; and
 a seal assembly disposed above the central opening and against the flanged seat, wherein the seal assembly is configured to seal the central opening, and the seal assembly comprises:
  a ribbed substrate disposed against the flanged seat of the pressure vacuum relief valve; and
  a pallet coupled to and disposed below the ribbed substrate,
 wherein the ribbed substrate is configured to support one or more weights, the pallet and the ribbed substrate are configured to move together away from the flanged seat, and the pallet is configured to seal against the ribbed substrate in a sealed position and is configured to pivot to an open position at an angle relative to the sealed position of the pallet, and
 wherein the first end comprises an extrusion extending into the central opening, wherein the extrusion comprises an angled contact surface configured to contact and partially bias movement of the pallet during actuation of the pallet.

6. The system of claim 1, wherein the ribbed substrate comprises a plurality of ribs extending from a base of the ribbed substrate, wherein the plurality of ribs is configured to support the one or more weights.

7. The system of claim 6, wherein the ribbed substrate comprises a plurality of openings disposed between the plurality of ribs and a cylindrical opening extending between the plurality of openings and a flexible diaphragm of the pallet.

8. The system of claim 1, comprising an annular, flexible seal disposed in an annular recess of the flanged seat, wherein the annular, flexible seal is sealingly engages the ribbed substrate.

9. The system of claim 1, wherein the pressure vacuum relief valve comprises an end-of-line pressure vacuum relief valve or an in-line pressure vacuum relief valve.

10. The system of claim 1, wherein the seal assembly comprises at least one guide bolt and a respective spring disposed about the at least one guide bolt, wherein the at least one guide bolt is fixed to the ribbed substrate and extends through a respective tapered slot of the pallet, and wherein the respective spring is retained about the at least one guide bolt between the pallet and a respective retaining component disposed at an end of the at least one guide bolt opposite the ribbed substrate.

11. A system, comprising:
a plurality of storage containers;
a manifold fluidly coupled to each of the plurality of storage containers; and
a pressure vacuum relief valve fluidly coupled to the manifold, wherein the pressure vacuum relief valve comprises:
 a seal assembly configured to seal the manifold from an exterior environment, and the seal assembly comprises:
  a ribbed substrate disposed against a flanged seat of the pressure vacuum relief valve; and a pallet coupled to and disposed below the ribbed substrate, wherein the pallet seals against the ribbed substrate in a sealed position, the pallet and the ribbed substrate move together away from the flanged seat when a first pressure within the manifold exceeds a maximum threshold pressure, and the pallet pivots to an open position at an angle relative to the sealed position of the pallet when the first pressure within the manifold falls below a minimum threshold pressure, and wherein when the pressure within the manifold falls below the minimum threshold pressure, the pallet contacts an angled contact surface of the pressure vacuum relief valve, causing the pallet to pivot to the open position.

12. The system of claim 11, wherein the pallet comprises a flexible diaphragm exposed to the first pressure within the manifold and a second pressure within the exterior environment.

13. The system of claim 12, wherein the second pressure is an atmospheric pressure.

14. The system of claim 11, wherein the angled contact surface extends partially into a central opening of the pressure vacuum relief valve, wherein the contact surface blocks movement of a first radial side of the pallet when the first pressure within the manifold falls below the minimum threshold pressure.

15. The system of claim 11, wherein the ribbed substrate comprises a plurality of ribs extending from a base of the ribbed substrate and a plurality of passages extending between the plurality of ribs, wherein the plurality of ribs is configured to support one or more weights, a number of the one or more weights is selected based on a desired value of the maximum threshold pressure, and the plurality of openings are configured to enable fluid flow from the exterior environment to the pallet.

16. A seal assembly of a pressure vacuum relief valve, comprising:

a ribbed substrate disposed against a flanged seat of the pressure vacuum relief valve, wherein the ribbed substrate comprises a plurality of ribs extending from a base of the ribbed substrate; and a pallet coupled to and disposed below the ribbed substrate, wherein the pallet comprises a top ring, a bottom ring, and a flexible diaphragm captured between the top ring and the bottom ring, wherein the flexible diaphragm of the pallet is seals against the ribbed substrate in a sealed position, the pallet and the ribbed substrate move together away from the flanged seat when a first pressure on a first sealed side of the pressure vacuum relief valve exceeds a maximum threshold pressure, and the pallet pivots to an open position at an angle relative to the sealed position of the pallet when the first pressure on the first sealed side of the pressure vacuum relief valve falls below a minimum threshold pressure, wherein when the pressure on the first sealed side of the pressure vacuum relief valve falls below the minimum threshold pressure, the pallet contacts an angled contact surface of the pressure vacuum relief valve, causing the pallet to pivot to the open position.

17. The seal assembly of claim 16, comprising at least one guide bolt and a respective spring disposed about the at least one guide bolt, wherein the at least one guide bolt is fixed to the ribbed substrate and extends through a respective tapered slot of the pallet, and wherein the respective spring is retained about the at least one guide bolt between the pallet and a respective retaining component disposed at an end of the at least one guide bolt opposite the ribbed substrate.

18. The seal assembly of claim 16, comprising at least one weight disposed on the plurality of ribs, and a plurality of fluid flow passages extending between the plurality of ribs and below the at least one weight, wherein a number of the at least one weight is selected based on a desired value of the maximum pressure threshold, and the plurality of fluid flow passages are configured to enable fluid flow from a second sealed side of the pressure vacuum relief valve to the first sealed side of the pressure vacuum relief valve.

* * * * *

UNITED STATES PATENT AND TRADEMARK OFFICE
CERTIFICATE OF CORRECTION

PATENT NO. : 9,777,856 B2
APPLICATION NO. : 14/561482
DATED : October 3, 2017
INVENTOR(S) : James Myers et al.

Page 1 of 1

It is certified that error appears in the above-identified patent and that said Letters Patent is hereby corrected as shown below:

In the Specification

At Column 2, Line 59, "theshold" should be -- threshold --.

At Column 15, Line 8, "includes" should be -- include --.

In the Claims

At Column 22, Line 7, "pallet is seals" should be -- pallet seals --.

Signed and Sealed this
Twenty-eighth Day of May, 2019

Andrei Iancu
*Director of the United States Patent and Trademark Office*